(12) United States Patent
DiMarco et al.

(10) Patent No.: US 12,711,343 B2
(45) Date of Patent: Aug. 18, 2026

(54) MOBILE DRIVER'S LICENSE READER

(71) Applicant: L-Tron Corporation, Victor, NY (US)

(72) Inventors: Trevor Zachary DiMarco, Farmington, NY (US); Kenneth Nelson Gravenstede, Lima, NY (US); Mark Conrad, Rochester, NY (US); Trey H. McIntyre, Fairport, NY (US); Charles S. Waldman, Manvel, TX (US); Viet Quoc Nguyen, West Henrietta, NY (US)

(73) Assignee: L-Tron Corporation, Victor, NY (US)

( * ) Notice: Subject to any disclaimer, the term of this patent is extended or adjusted under 35 U.S.C. 154(b) by 0 days.

(21) Appl. No.: 19/187,866

(22) Filed: Apr. 23, 2025

(65) Prior Publication Data

US 2025/0335733 A1 Oct. 30, 2025

Related U.S. Application Data

(60) Provisional application No. 63/637,934, filed on Apr. 24, 2024.

(51) Int. Cl.
*G06K 19/06* (2006.01)

(52) U.S. Cl.
CPC .............................. *G06K 19/06028* (2013.01)

(58) Field of Classification Search
CPC ................................................ G06K 19/06028
USPC ..................................................... 235/462.01
See application file for complete search history.

(56) References Cited

U.S. PATENT DOCUMENTS

| | | | | |
|---|---|---|---|---|
| 10,748,417 | B1 * | 8/2020 | Demisse | G08G 1/017 |
| 10,854,027 | B1 * | 12/2020 | Lucks | G07C 9/253 |
| 10,922,672 | B2 * | 2/2021 | Chitalia | H04L 9/3213 |
| 11,491,911 | B1 * | 11/2022 | Fowler | H04W 4/44 |
| 11,527,087 | B1 * | 12/2022 | Geusz | G06V 30/416 |
| 11,663,686 | B1 * | 5/2023 | Durairaj | B60R 25/25 705/4 |
| 2005/0149358 | A1 * | 7/2005 | Sacco | G06Q 30/04 705/2 |
| 2012/0101944 | A1 * | 4/2012 | Lin | G06Q 20/40 726/4 |

(Continued)

OTHER PUBLICATIONS

International Search Report and Written Opinion mailed Jul. 16, 2025 in connection with International Application No. PCT/US2025/026065.

(Continued)

*Primary Examiner* — Allyson N Trail
(74) *Attorney, Agent, or Firm* — Wolf, Greenfield & Sacks, P.C.

(57) ABSTRACT

A reader and method for reading a mobile driver's license (mDL) and other forms of electronic identification are provided. The reader may establish wireless communication with a driver's mobile device to receive the mobile driver's license information from the smartphone after prompting the driver to approve transfer of the information. The reader may securely store the received information and transfer the information to a docking system and may ensure reliable deletion of the data by linking the data with a triggering event. The reader may also read physical driver's licenses and other forms of physical identification, car registrations, and other similar items, and may capture images.

13 Claims, 15 Drawing Sheets

(56) References Cited

U.S. PATENT DOCUMENTS

2012/0290449 A1* 11/2012 Mullen .............. G06Q 20/3278 705/26.1
2013/0201000 A1* 8/2013 Solomon .................. G07C 9/29 340/5.83
2013/0314207 A1* 11/2013 Yonekura ............. G06Q 20/352 340/5.8
2017/0046808 A1* 2/2017 Parrish ................. G06K 7/1417
2017/0293787 A1* 10/2017 Utykanski .............. G06K 7/146
2019/0172167 A1* 6/2019 Scholl .................... G06Q 50/26
2019/0325544 A1 10/2019 Sweet
2020/0387700 A1* 12/2020 Wu ...................... G06V 10/431
2021/0166303 A1* 6/2021 Gideon, III .......... G06Q 20/145
2021/0192496 A1* 6/2021 Gregovic ............... G06N 20/20
2021/0326588 A1* 10/2021 Özyigit .................... G07D 7/20
2021/0370877 A1* 12/2021 Peterson ............... B60R 16/023
2021/0385224 A1* 12/2021 Singh .................. H04L 63/0853
2021/0390208 A1 12/2021 Lee
2022/0092879 A1* 3/2022 Pearson ............... G06V 30/413
2022/0335263 A1* 10/2022 Balgañón Canela ........................ G06Q 30/0226
2022/0382854 A1* 12/2022 Ungerholm ............ G06Q 30/06
2022/0391482 A1* 12/2022 Villanueva Gaviola ..................... G06F 3/0482
2023/0010082 A1* 1/2023 Gabriner ................ G06Q 50/40
2023/0155812 A1* 5/2023 Bennison .............. H04L 9/0861 713/171
2023/0274036 A1* 8/2023 Li ....................... G06F 21/6245 726/26
2023/0290207 A1* 9/2023 Hall ................... G07C 9/00309
2023/0317221 A1* 10/2023 Blechman .............. G16H 10/60 705/3
2024/0013881 A1* 1/2024 Lytvynenko ............ H04L 9/321
2024/0386432 A1* 11/2024 Lee .................... G06Q 20/3274

OTHER PUBLICATIONS

[No Author Listed], Personal identification—ISO compliant driving licence—Part 5: Mobile driving licence (mDL) application. International Standard: ISO/IEC 18013-5. Sep. 2021 162 pages.

* cited by examiner

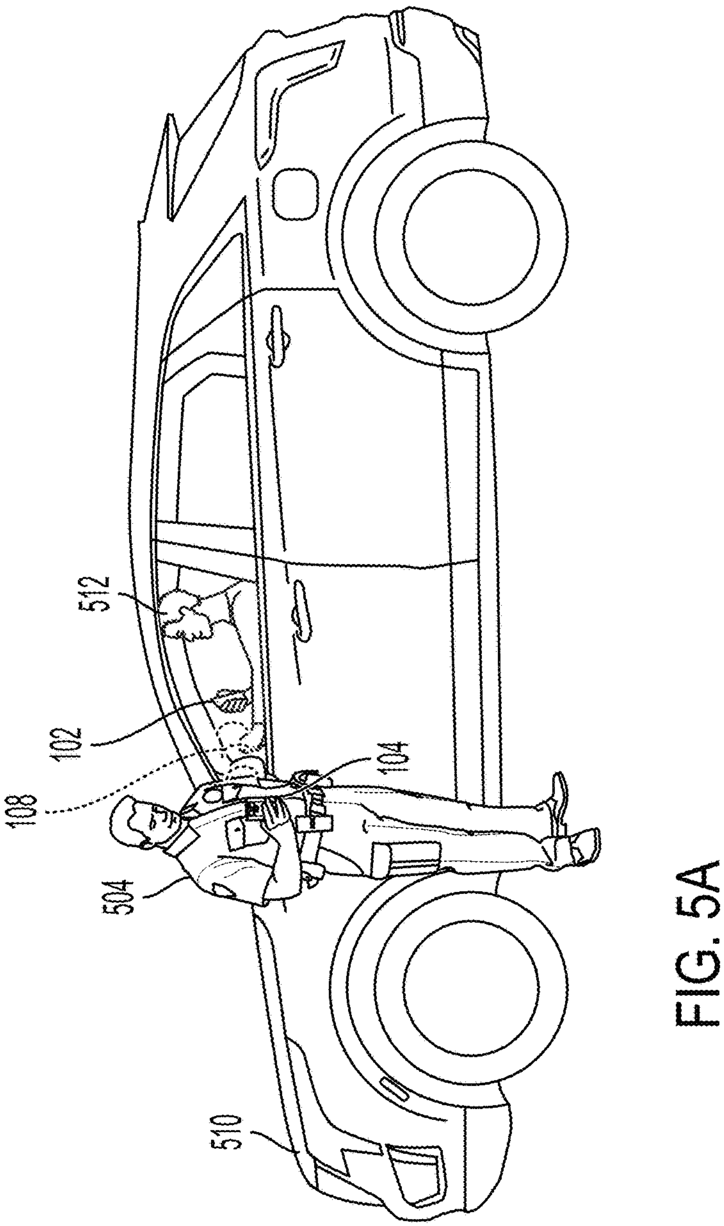
FIG. 5A
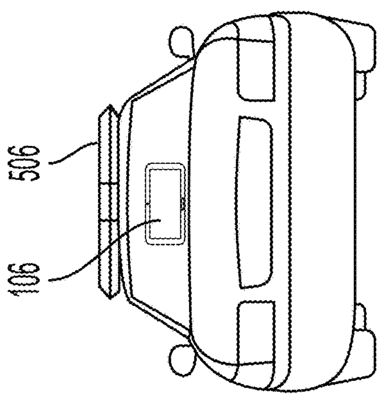

MOBILE DRIVER'S LICENSE READER

CROSS-REFERENCE TO RELATED APPLICATIONS

This application claims the benefit under 35 U.S.C. 119(e) of U.S. Provisional Application Ser. No. 63/637,934, filed Apr. 24, 2024, and entitled "MOBILE DRIVER'S LICENSE READER," which is hereby incorporated herein by reference in its entirety.

BACKGROUND

Field

Aspects of the technology relate to readers and methods for mobile driver's licenses (mDL) and other forms of electronic identification.

Related Art

Driver's licenses are a common form of identification used by police and other officials when interacting with individuals. For example, a police officer may review an individual's driver's license during a traffic stop or when investigating a car accident. Conventionally, driver's licenses take the form of a physical card, and include various information printed thereon, such as the driver's license number, a picture of the driver, the driver's name, address, birthdate, height, weight, hair color, and eye color. Also, some driver's licenses include a barcode that is readable by a barcode scanner to capture information from the driver's license.

Mobile driver's licenses (mDL), also known as digital driver's licenses (DDL), digital IDs, or mobile IDs, are now available in some jurisdictions.

SUMMARY

According to aspects of the present technology, there is provided an electronic identification reader configured to read government-issued electronic identification, comprising: a handheld housing; a wireless communication module disposed within the handheld housing and configured to communicate wirelessly with a mobile electronic device storing a government-issued electronic identification to receive the government-issued electronic identification from the mobile electronic device.

In some embodiments, the electronic identification reader further comprises at least one processor configured to: obtain identification information from the government-issued electronic identification; process the identification information from the government-issued electronic identification; and after processing the identification information from the government-issued electronic identification, deleting the identification information from the government-issued electronic identification from the electronic identification reader.

In some embodiments, processing the identification information from the government-issued electronic identification comprises transferring the identification information from the government-issued electronic identification to a docking system communicatively coupled with the electronic identification reader.

In some embodiments, the electronic identification reader further comprises a retention member configured to engage with a complementary retention feature of a body-mounted holster.

In some embodiments, the electronic identification reader further comprising an NFC circuit; and at least one processor configured to, after a triggering event, lock the electronic identification reader until the NFC circuit detects an NFC tag of a docking system or the holster.

In some embodiments, receiving the government-issued electronic identification from the mobile electronic device comprises limiting transfer of information from the mobile electronic device other than the government-issued electronic identification.

In some embodiments, the electronic identification reader further comprises a code scanner configured to scan a code of a physical identification.

In some embodiments, the electronic identification reader further comprises at least one touch-sensitive control disposed on the handheld housing; a camera disposed in the handheld housing and configured to, in response to a first input from the at the at least one touch-sensitive control, capture an image of a code of a physical identification; at least one processor disposed in the handheld housing and configured to: in response to a second input from the at the at least one touch-sensitive control, trigger the mobile electronic device to prompt a user of the mobile electronic device with a request for approval to transmit the government-issued electronic identification from the mobile electronic device; upon the approval to transmit the government-issued electronic identification from the mobile electronic device, request the government-issued electronic identification; perform the receiving the government-issued electronic identification from the mobile electronic device; and obtain identification information from the government-issued electronic identification; a physical connection between the identification reader and a vehicle-mounted docking system configured to transfer the identification information from the government-issued electronic identification to the vehicle-mounted docking system, wherein the at least one processor is further configured to, after the physical connection transfers the identification information from the government-issued electronic identification to the vehicle-mounted docking system, delete the identification information from the government-issued electronic identification from the electronic identification reader In some embodiments, the electronic identification reader is further configured to: obtain a plurality of pieces of information from one or more persons, wherein at least one of the piece of information of the plurality of pieces of information is selected from the group consisting of: an identification, a vehicle registration, and a vehicle insurance, wherein the electronic identification reader further comprises a display configured to display the plurality of pieces of information.

In some embodiments, the electronic identification reader is configured to wirelessly connect to a docking system.

In some embodiments, the electronic identification reader further comprises a wired connection configured to connect to a docking system.

According to aspects of the present technology, there is provided a method of reading a government-issued electronic identification, the method comprising: initiating wireless communication with a mobile electronic device storing a government-issued electronic identification; upon approval to transmit the government-issued electronic identification from the mobile electronic device, requesting the government-issued electronic identification; receiving the government-issued electronic identification; and encrypting the government-issued electronic identification.

In some embodiments, the method further comprises: triggering the mobile electronic device to prompt a user of the mobile electronic device with a request for the approval to transmit the government-issued electronic identification from the mobile electronic device.

In some embodiments, the method further comprises: processing identification information from the government-issued electronic identification using an electronic identification reader; and after processing the identification information from the government-issued electronic identification, deleting the identification information from the government-issued electronic identification from the electronic identification reader.

In some embodiments, receiving the government-issued electronic identification comprises limiting transfer of information from the mobile electronic device other than the government-issued electronic identification.

According to aspects of the present technology, there is provided at least one non-transitory computer-readable storage medium having instructions encoded thereon that, when executed by at least one processor, cause the at least one processor to perform a method of reading a government-issued electronic identification, the method comprising: initiating wireless communication with a mobile electronic device storing a government-issued electronic identification; upon approval from the mobile electronic device, requesting the government-issued electronic identification; receiving the government-issued electronic identification; and encrypting the government-issued electronic identification.

In some embodiments, the method further comprises: triggering the mobile electronic device to prompt a user of the mobile electronic device with a request for the approval to transmit the government-issued electronic identification from the mobile electronic device.

In some embodiments, the at least one non-transitory computer-readable storage medium, further comprises: instructions encoded thereon that, when executed by the at least one processor, cause the at least one processor to connect with a docking system, and after connecting with the docking system, selectively perform at least one of: transferring identification information from an electronic identification reader to the docking station; deleting identification information from the electronic identification reader; or installing an update to the electronic identification reader.

In some embodiments, receiving the government-issued electronic identification comprises limiting transfer of information from the mobile electronic device other than the government-issued electronic identification.

In some embodiments, the at least one non-transitory computer-readable storage medium further comprises: instructions encoded thereon that, when executed by the at least one processor, cause the at least one processor to scan a code of a physical identification.

BRIEF DESCRIPTION OF DRAWINGS

Various aspects and embodiments of the application will be described with reference to the following figures. It should be appreciated that the figures are not necessarily drawn to scale. Items appearing in multiple figures are indicated by the same reference number in all the figures in which they appear.

FIG. 5A illustrates use of a dual-purpose reader for mobile driver's licenses and physical driver's licenses in reading a mobile driver's license according to a non-limiting embodiment.

DETAILED DESCRIPTION

Figure 1:
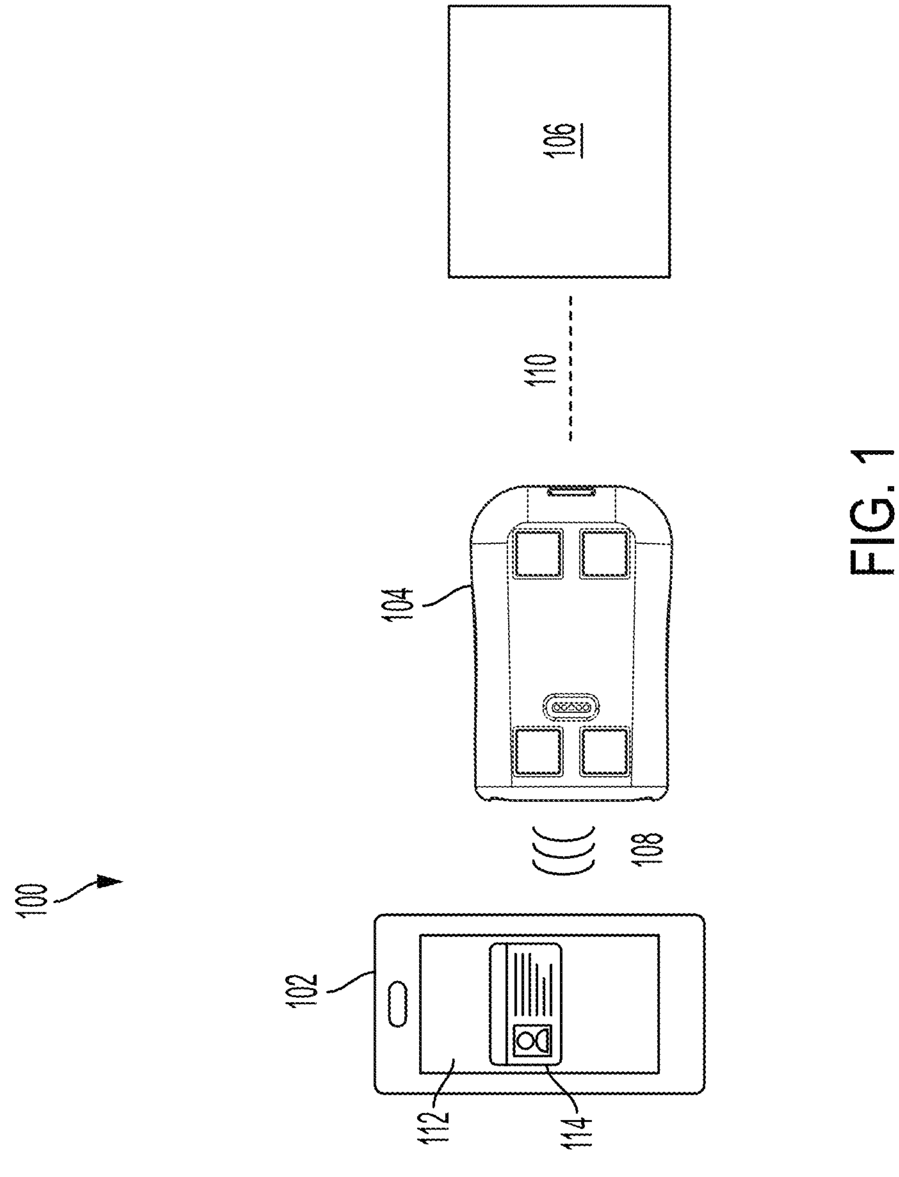
FIG. 1 illustrates a system for reading a mobile driver's license according to a non-limiting embodiment.

A portable reader and method for reading a mobile driver's license (mDL) are provided. The reader may be carried by users such as law enforcement personnel, (e.g., police officers), and used to interrogate a person's mDL. Thus, the law enforcement personnel may use the reader in the context of a traffic stop, accident investigation, or other scenario in which the law enforcement personnel desire to identify an individual or collect information from the individual's driver's license. In at least some embodiments, the reader is carried or worn by the law enforcement personnel or other user and used to gather information about an individual's mDL from the individual's mobile device (e.g., smartphone). The reader may then transfer the information to a computer system in a police car or facility via a wired or wireless connection.

In various embodiments, readers and methods described herein may read and transmit information from various forms of government-issued electronic identification. Government-issued electronic identification may include personal information issued by a government entity and stored in an electronic format in compliance with government requirements. The government requirements may, for example, reflect or comport with an accepted standard for verifiable identification, such as the ISO/IEC 18013-5 standard for driver's licenses. In some embodiments, government-issued electronic identification may include personal information verified by a government entity and may include sensitive personal information, such as full name, date of birth, age, physical characteristics (e.g., height, hair color, eye color), social security number (SSN), or other identifying numbers. Given the sensitive nature of such information and the intended use of the identification as a manner of verifying the identity of an individual or their personal information, a government-issued electronic identification may be encrypted. Examples of government-issued electronic identification include mobile driver's licenses (mDL) also known as digital driver's licenses (DDL), digital IDs, mobile IDs, state ID cards, electronic passports or passport cards, electronic social security cards, electronic birth certificates, electronic permanent resident cards or alien registration receipt cards, U.S. military or military dependent ID cards, electronic Native American identification documents and other forms of electronic identification. For purposes of explanation, the following description of various embodiments focuses on the example electronic identification of an mDL, and the use of a reader by law enforcement. Accordingly, readers described herein may be electronic identification readers or mDL readers. However, it should be appreciated that the various embodiments described herein apply to electronic identification generally—including those kinds of electronic identification listed above—and to users besides law enforcement.

Scanning an mDL presents various challenges, technical and otherwise. For example, the mDL may reside on the card holder's mobile electronic device (e.g., smartphone) to which the law enforcement personnel has limited access. Such mobile devices often store information such as contacts, emails, text messages, location information, calendar information, user health information (e.g., from fitness tracking mobile applications), account information, pictures, and music, or other types of information described herein. The law enforcement personnel may have limited access to the device, either as a practical matter or due to policy or legal restrictions on the law enforcement personnel. For instance, the law enforcement personnel may not be permitted to physically handle the mobile device and/or to take it back to a police car for recording mDL information, as is typically done with physical driver's licenses. Therefore, conventional scanners typically used with physical driver's licenses, which may be tethered to a police car, are not usable with an mDL. Moreover, it may be important in at least some circumstances that the law enforcement personnel do not see other information besides the mDL on the individual's mobile device, for instance to avoid an invasion of privacy or the perception of impropriety. Aspects of the present technology provide readers for mDLs that are portable and that overcome one or more of these challenges and may also address further challenges not listed above.

The reader may obtain and handle the mDL information in a secure manner, which may be beneficial because not only is the mDL information itself sensitive but the mDL information may reside on an individual's mobile device along with various other information of the types described above. Thus, the reader may be operable to obtain the intended mDL information in a manner that does not require the law enforcement personnel to handle the individual's mobile device and in a manner that does not access information on the individual's mobile device other than that needed to obtain the mDL information. For example, the reader may establish wireless communication with a driver's mobile device to receive the mDL license information (data) from the mobile device only after prompting the driver to approve transfer of the information. The reader may use one or more communication protocols such as near field communication (NFC), Bluetooth®, or Wi-Fi® to establish a communication session with a mobile device, receive transfer permission from the user(s) of the mobile device, and then use the one or more communication protocols to receive driver information included in an mDL linked to the mobile device. In some embodiments, the reader may use detection of an NFC tag or a capture of an image of a QR code scan to establish a communication session with a mobile device, and thereafter, NFC, Bluetooth®, or Wi-Fi® may be used to receive transfer permission from the user of the mobile device and to receive the mDL linked to the mobile device. For example, in some embodiments, a user of a reader removes the reader form a holster or a dock and the reader is enabled. The individual's mobile device then displays a code, and the user of the reader holds up the reader to scan the code and the mDL transfer routine executes. The collection of information may be limited to only the mDL information and no other information in at least some embodiments. The wireless communication may be via a secure channel established between the reader and the individual's mobile device.

In some embodiments, when the reader is removed from the holster or dock it may immediately begin to scan for mDLs. For example, the reader may immediately begin to scan for available phones in one or more ways: NFC, QR code or barcode, by displaying its own code that the mDL holder can scan. If the reader uses one of these methods to identify an available mDL, then the reader may read the mDL.

In some embodiments, the mobile device may allow the individual to selectively approve transfer of information from the individual's identification, meaning that the individual may approve transfer of all the identification information, partial identification information, or none of the information. For example, the prompt display on the mobile device may allow the individual to select which pieces of information to transfer. In some embodiments, partial authorization of information might include one or more of name, date of birth, age, an indication the user is over/under the age of 21 (or another age of interest), a photo of the individual, or any combination of such information. For example, if a reader is used at a liquor store in a jurisdiction where the alcohol possession age is 21, the mobile device may allow the individual to authorize transfer of only an indication the individual is over/under the age of 21, and their photo so that the user of the reader can confirm the electronic identification belongs to the individual.

The reader may securely store the received information for a period of time prior to transferring the information to a docking system (e.g., in a police car) or other computer system component. For example, in the context of a traffic stop, a police officer may carry the reader with them to the car that has been pulled over, to collect the driver's mDL at the point of the driver's car. This contrasts with carrying a driver's license back to the police car to record the driver's license information. Thus, the reader may be configured to store the mDL information sufficiently long for the police officer to return to their police car to transfer the information to a secure police computer system. In some situations, that time period may be significant, for instance if the police officer must handle other tasks before returning to their car, such if the police officer is dealing with multiple drivers, injuries, unsafe conditions, or otherwise. However, storing the mDL information on the reader presents risk of exposing the data unintentionally. The police officer may be far from their car, or may be in an uncontrolled environment, such as during an arrest or subsequent altercation with a suspect. Thus, the reader may encrypt mDLs so that the mDL is encrypted at rest in the reader. In addition, any communication of the mDL information may be executed via an encrypted protocol. In this manner, loss of the reader does not compromise the security of the individual's mDL. In other embodiments, communication of mDL information from a reader may be executed via an unencrypted protocol.

Data from the mDL may be transferred to a system (e.g., a second device) coupled to the reader. The system may then perform additional processing on the data. For example, during or following a traffic stop, all collected data or a selected set of the collected data may be integrated into a data structure for a report and may be transferred to a computer linked with the reader. After the transfer, the report may enable automatic filling of any eCitation form that is appropriate based on the collected data from the traffic stop and may enable documentation of the scene of the traffic stop, accident, crime, or other scene at which a law enforcement officer is present. The system to which the reader transfer the mDL information and/or other collected information may be a secure computer in a police car, or other secure computing system, and may include a dock for the reader in some embodiments.

The reader may be configured to delete the mDL information by, for example, linking deletion of the information with a triggering event. For example, when data is captured from a driver's license using the reader, the data may be linked with a lifespan data structure that indicates a triggering event for deletion of the data from the reader. The triggering event may be elapsed time, completion of transfer of the data from the reader to another device (e.g., a docking system), completion of a report including the mDL information, or another event at which point the mDL data is no longer needed or allowed (e.g., by law) to be retained by the law enforcement personnel. Deletion of the mDL data from the reader may limit the security risk of having stored the mDL data locally on the reader.

Thus, according to aspects of the present technology, the collection, storage, and transfer of mDL information with reader is conducted in a manner which provides for high security of the information. This manner of operation allows for the use of mDLs as a reliable form of identification in a variety of situations.

In some embodiments, a reader is configured to read both mDLs and physical driver's licenses (and other forms of physical identification). The inventors have appreciated that while mDLs are now available in some jurisdictions, the use of physical driver's licenses persists, and therefore law enforcement personnel are likely to encounter both types of driver's licenses. However, the law enforcement personnel may not know in advance of interacting with a driver, or other individual, which type of license the individual possesses. Embodiments of the present technology are configured to read both types of driver's licenses. For example, the reader may include wireless communication circuitry for wireless reading an mDL, and may include an optical scanner (e.g., a barcode scanner) for reading a physical driver's license. In some embodiments, the reader is a dual-mode reader, operable in one mode to read an mDL and operable in another mode to read a physical driver's license. Such readers may be provided in a compact form factor suitable for law enforcement personnel to carry or wear, despite the enhanced functionality. Also, dual functionality readers increase applicability and convenience of the reader compared to if two separate readers were required for reading physical driver's licenses and mDLs. Such characteristics are particularly beneficial in the setting of a police car in which space is limited for electronics and in the context of a police officer having to carry the reader given the various other items police officers have to carry.

In some embodiments, the reader may provide various functions beyond capturing mDL information. For example, the reader may also read car registrations and other similar items. Such items may include a code (e.g., barcode, QR code, or other code) and the reader may include a suitable code scanner, such as a barcode scanner. The reader may include an imaging device, such as a camera, for imaging the code, capturing pictures or video of documentation (e.g., driver's licenses), people (e.g., drivers), scenes, evidence, or other items of interest. The reader may include audio or video recording capability. Thus, the reader according to some embodiments is a multi-functional device configured to perform a number of functions.

In some embodiments, the reader provides for collection of driver data from multiple license holders, using multiple forms of driver's license (mDL and physical). Such collection may be performed at the location of the license holder since, again, the law enforcement personnel may not be able or permitted to take the license holder's mobile electronic device back to a police car to record the data. The reader may permit the law enforcement personnel to distinguish information from multiple license holders by activation of the reader. For example, each activation action (e.g., button press on the reader) may result in separately stored mDL information. Such separate identification of information may be useful when transferring the information to a secure computing system for completing a police report or other report relating to collection of the mDL information. The separate information different license holders may include photographic information, insurance documentation, voice recordings, and other related information. Such storage of information for multiple license holders may simplify the interactions of law enforcement personnel with the license holders, and also improve safety by reducing the interaction duration.

According to embodiments of the present technology, readers are integrated into a low cost, rugged, water resistant (or waterproof), battery-powered device having a handheld format. Such a format may facilitate use of the reader by police (or other law enforcement personnel) in a variety of physical environments and for a variety of types of interactions, including routine traffic stops, accident investigations, and emergency situations, among others.

Thus, it should be appreciated from the foregoing that aspects of the present technology relate to devices and methods for reading an mDL. The reader may comprise various hardware and software features allowing for reading of an mDL, secure storage of the mDL information on the reader, and communication both with the license holder's device storing the mDL and with a docking system or other computing system. In some embodiments, the reader may also be capable of reading a conventional driver's license, so that a single reader may serve dual purposes as a reader of conventional physical driver's licenses and an mDL.

The aspects and embodiments described above, as well as additional aspects and embodiments, are described further below. These aspects and/or embodiments may be used individually, all together, or in any combination of two or more, as the application is not limited in this respect.

FIG. 1 illustrates a system for reading an mDL according to aspects of the present technology. The system 100 includes an electronic device 102, a reader 104, and a docking system 106.

The electronic device 102 is linked to and/or stores an mDL 114. The electronic device 102 may be a driver's personal mobile device, such as a smartphone or smartwatch, and may include a display 112 displaying a visual representation of the mDL 114. The electronic device 102 may store various information in addition to the driver's mDL, such as car registration information, contacts, emails, text messages, location information, calendar information, user health information (e.g., from fitness tracking mobile applications), account information, pictures, and music, or other types of information described herein. The electronic device 102 may include wireless communication components configured for executing wireless communication. Such wireless communication components may be used to communicate with a reader of the types described herein.

Figure 2:
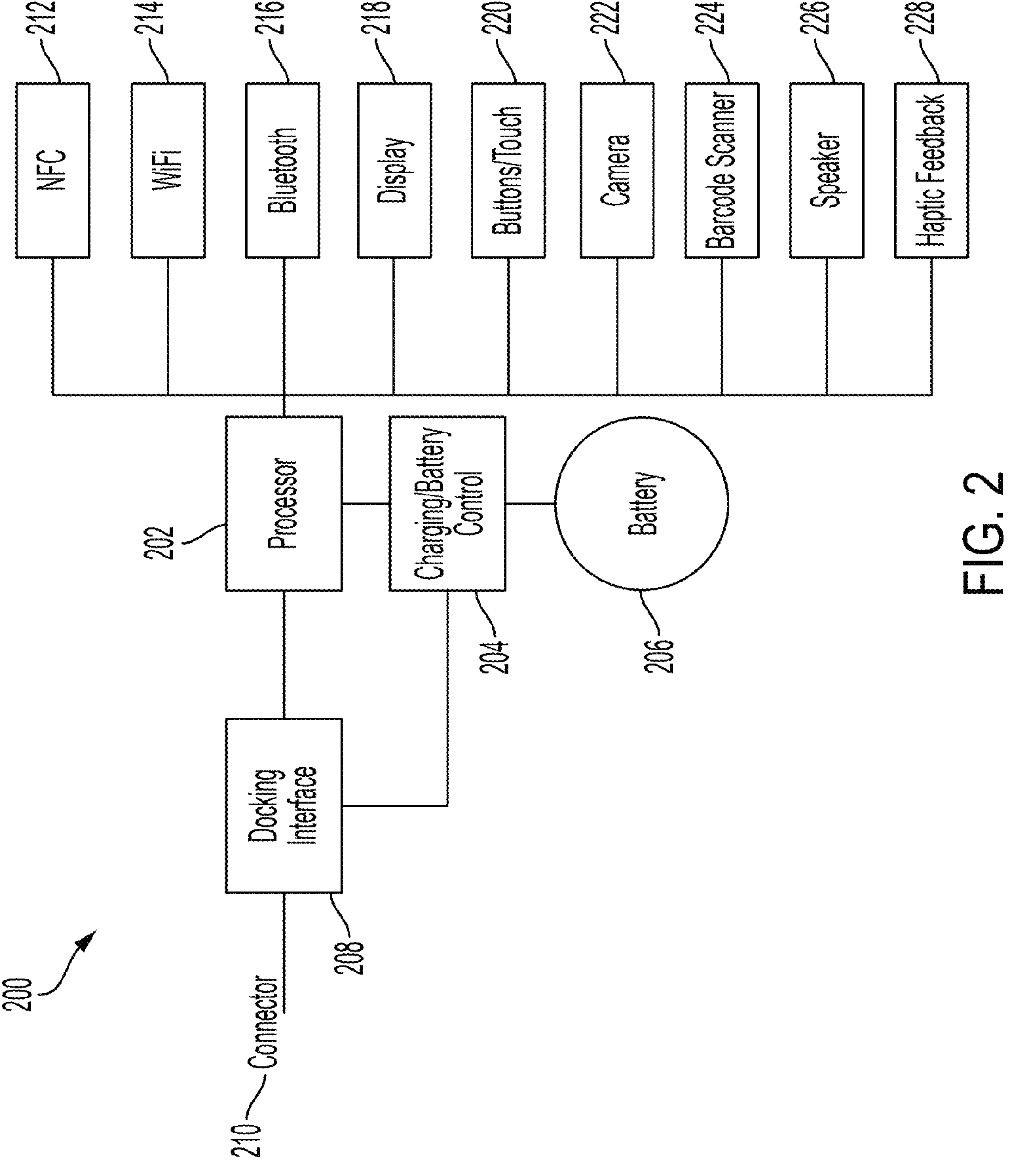
FIG. 2 is a block diagram of a reader for mobile driver's licenses according to a non-limiting embodiment.

The reader 104 may be configured to communicate with the electronic device 102 to read the mDL. Thus, the reader 104 may be a reader of the various types described herein, including a reader capable of reading both mDLs and physical driver's licenses. The reader 104 may include various hardware components and software providing its functionality of reading an mDL, storing the mDL securely, and transferring the mDL to a second electronic component, such as a docking system 106. Examples of such components are illustrated in FIG. 2 and described further below in connection with that figure.

The reader 104 may be portable. Thus, the reader 104 may be sized to be handheld so that a police officer or other user can easily manipulate the reader 104. In some embodiments, the reader may be worn or mounted, for example being worn on a wrist, waist (e.g., on a belt), or otherwise mounted to a user's body. In such embodiments, the reader may be small to reduce its weight and impact on the user. The reader may have an ergonomic design and may have various control components (e.g., buttons, switches, and touchscreen) positioned to allow for operation with a single hand.

The docking system 106 may be configured as a dock and host for the reader 104. The docking system 106 may be disposed or mounted in a police car and include a computing system or a connection to a computing system for operating a program to create an eCitation, incident report, or other report for documenting police encounters.

The electronic device 102 and reader 104 may communicate wirelessly via a wireless link 108. The reader 104 may initiate communication and may receive the mDL information from the electronic device 102. For example, during a traffic stop, a police officer may approach a driver in a car and position the reader 104 suitably to wirelessly read the mDL from the driver's electronic device 102, described in more detail below with respect to FIG. 5A.

In some embodiments, the reader 104 may wirelessly connect to an electronic device 102 via interfaces defined by an accepted protocol for government-issued electronic identification, one non-limiting example being the interfaces defined in ISO/IEC 18013-5. Once connected, the reader 104 may request information from the user's mDL. The request may trigger a prompt on the electronic device 102 requesting user approval for mDL transfer. Upon user approval, data of the mDL is wirelessly transmitted and stored on the reader 104 for subsequent processing, such as encryption and/or transfer to a law enforcement computer such as docking system 106.

In at least some embodiments, the reader 104 is configured to read only the mDL from the electronic device 102 and may limit transfer of other data linked with the electronic device 102. Since the electronic device 102 is a personal device to the driver and may include information beyond the mDL, at least some of which may be sensitive information, the reader 104 may be configured to communicate with the electronic device 102 only in the manner needed to acquire the mDL and no additional personal information of the driver. Such functionality may maintain the integrity of the police officer's interactions with the driver.

The reader 104 may securely process collected data in the manner described previously herein. The reader 104 may store the mDL in a secure fashion and only so long as needed to transfer the mDL to the docking system in some embodiments. For example, the reader 104 may be configured to encrypt, into a transformed data structure, the mDL received from the electronic device 102 and store the mDL in an encrypted format. Additionally, communications between the reader and other components (e.g., electronic device 102 and docking system 106) may be encrypted. The information stored on the reader 104 may be transferred to the docking system 106 and then deleted from the reader 104. The reader 104 may be configured to delete collected information based on a triggering event. For example, upon reception of mDL information, the information may be linked with a lifespan data structure that indicates the triggering event. The triggering event may be an elapsed time or completion of a data processing or transfer step. For example, in some embodiments, the information may be deleted from the reader automatically after a pre-determined time period (e.g., less than 10 minutes, less than 5 minutes, or other times within such ranges) even if the data has not yet been transferred off the reader. The data may also be deleted from the reader 104 after successful data transfer to another device such as the docking system 106, or upon completion of a documentation step at the docking system such as completing an eCitation or filling out a police report. In some embodiments, the data on the reader 104 may be automatically deleted if a tampering event is detected, such as an unauthorized individual using the reader. Such temporary, secure storage of the mDL information on the reader 104 may permit use of a reader that is handheld and/or carried by a police officer while reducing the risk of the reader becoming lost or stolen and having the mDL information retrieved by an unauthorized individual. In other embodiments, the data on the reader 104 may be manually deleted by a user after the user verifies transfer of the data to eCitation or other software, or the data may be automatically deleted by a linked host software program.

The reader 104 and docking system 106 may communicate via link 110, which may be a wired or wireless link. For example, a USB connection may be utilized in some embodiments. Alternatively, Wi-Fi®, Bluetooth®, or other communication protocols may be used. The docking system 106 may reside, for example, in a police car. When a police officer returns to the car with the reader 104 after scanning an mDL at a driver's car, the police officer may dock the reader 104 to the docking system 106 and initiate transfer for data from the reader 104 to the docking system (which as described above, may include a pass-through dock and a host comprising a personal computer). For example, the mDL information stored on the reader may be transferred to the docking system for populating an eCitation report or incident report. The mDL information may then be deleted from the reader 104. Upon successful transaction with the eCitation software, the mDL information may then be deleted from the reader 104 automatically or by the user.

When a reader is coupled with a dock, the reader may be switched to a mode for communicating with software, such as eCitation software. When the reader is in the dock, it may not be available for reading. When the reader is removed from the dock or from a holster, the reader can be enabled to engage in the reading process. Accordingly, unlike conventional wireless scanners (such as movie ticket scanners) the readers herein provide unique functionality allowing the reader to communicate both with a device storing an mDL (e.g., mobile phone) and also with a device running host software (e.g., eCitation software). In contrast, conventional wireless scanners may simply scan codes locally, and have no capability to communicate with eCitation software.

One example process of using the reader 104 is now provided, but alternatives are possible. A police officer may remove the reader 104 from the docking system 106 in a police car and attach the reader 104 to his/her belt or vest. The police officer may approach an individual of interest, such as a driver of a vehicle, and ensure the scene is safe. Then, the police officer may use the reader 104 to collect one or more of the following items, as non-limiting examples:

mDL (electronic transfer per mDL specification);

Physical Driver's License (barcode, photograph);

Automobile Registration (barcode, photograph);

Insurance Information (barcode, photograph);

Photograph of persons of interest, such as vehicle occupants; and

Photograph of vehicle/plates.

The police officer may then return to the patrol vehicle and place the reader 104 in the docking system 106 for transferring the collected data to the docking system. In some embodiments, the reader 104 is configured to communicate with the docking system 106 or other computer to transmit collected items directly to an eCitation application (e.g. TRACs). Such transfer may involve the reader 104 emulating one of three interface modes: USB Communication Port Emulation; USB human interface device (HID); or USB Keyboard.

The reader 104 may be able to interact with an mDL docking application via the docking system 106, which will allow collected items to be extracted from the reader 104 and one or more of the following functions performed, as non-limiting examples:

The information is saved to disk (photograph, decoded barcode contents, decoded mDL contents);

The information is copied to the clipboard (decoded barcode contents, decoded mDL contents, photograph, if any); and/or The information is transmitted to the docking application (TRACs, or other application) over a virtual serial port or other suitable communication protocol.

Example applications include ticketing applications, warrant applications, crash reporting applications, and arrest reporting applications).

Example docking system applications in which the data from the reader 104 may be used include ticketing applications, warrant applications, crash reporting applications, and arrest reporting applications.

Once stored on the docking system or connected personal computer (e.g., in the police car), the information stored on reader 104 may be deleted from the reader. As described previously, such operation may enhance secure operation of the reader 104 as a portable device storing sensitive information.

FIG. 2 is a block diagram of a reader 200 according to a non-limiting embodiment. FIG. 2 is an example of some hardware included in the reader 104 of FIG. 1, according to a non-limiting implementation of the reader 104.

As illustrated, the reader 200 may include a docking interface 208 for docking to a docking system, such as docking system 106 of FIG. 1. In some embodiments, the docking interface 208 may be hardware-based. For instance, in the illustrated example of FIG. 2 the docking interface 208 is a USB interface. In such implementations, the reader 200 may further comprise a connector 210, such as a USB connector. In an alternative embodiment, the connector may be on the docking system and may plug into the docking interface of the reader 200. Circuitry and software components may be included both on the reader 104 and the docking system 106 to facilitate communication between them.

The docking interface 208 may perform multiple functions. For example, the docking interface 208, and any associated connector (e.g., connector 210), may be used for charging the reader 200 and/or for transferring data between the reader 200 and the docking system. For example, the docking interface 208 may facilitate data transfer of the mDL information and other information stored on the reader 200 to the docking system. In some embodiments, a reader (e.g., reader 200) may charge when placed in a dock and/or may charge when coupled via direct connection (e.g. USB connection).

As an alternative to a hard connected docking interface, in some embodiments a reader may communicate with a docking system wirelessly using a suitable wireless communication protocol such as Wi-Fi® or Bluetooth®. The wireless communication may be used for transferring data of the types described previously herein. The reader 200 may be charged wirelessly.

The reader 200 may further include a processor 202. The processor 202 is configured to process various information, including an mDL, in the manners described elsewhere herein. For example, the processor 202 may control encryption of mDL information and storage of such information in a secure manner. The processor 202 may control separate identification of mDL information from multiple license holders. More generally, the processor 202 may coordinate the operations of the reader 200. The processor may be any suitable type of processor for doing so, such as a microprocessor, one or more processing cores, or an application specific integrated circuit (ASIC). The processor may include memory for storing mDL information, or the reader 200 may include separate memory for performing such storage, and the processor may communicate with such a memory.

In some embodiments, the processor 202 may lock functions of the reader 200. When the reader is locked, it may prevent capture, transfer, viewing, or other manipulation of identification information. For example, the processor 202 may lock the reader 200 after one or more triggering events. One such triggering event comprises the elapse of a predetermined amount of time. In some embodiments, triggering events may include the reader being a predetermined distance from a dock or holster, the reader reaching a low battery level, or a trigger signal being sent to the reader from an agency or other organization to which the user belongs (e.g., a police department may deactivate a reader with the trigger signal). The reader 200 may remain locked until the reader is connected to a docking system, or until an NFC circuit of the reader detects a paired NFC tag. As described in more detail below, said NFC tag may be disposed in a holster or in a component of a docking system.

The reader 200 may be battery powered, facilitating its use as a portable device. As has been described, law enforcement personnel may carry or wear a reader. Thus, the law enforcement personnel may have the reader with them when they are not near a power source, such as when approaching a stopped vehicle, when on patrol on foot, when investigating the scene of an accident or a crime, or otherwise. Thus, providing for battery power of the reader allows such usage. Therefore, the reader 200 comprises a battery 206. The battery 206 may be a rechargeable battery 206. The reader 200 may therefore further include a controller 204 for controlling battery operation and/or charging. A reader 200 may have a battery capacity (e.g., of battery 206) sized to power the reader through the duration of a standard traffic stop, patrol shift, or other police activity, factoring in the active use of the reader during that time to read one or more mDLs.

The reader 200 may include multiple forms of wireless communication circuitry, including a near field communication (NFC) circuit 212, Wi-Fi circuit 214, Bluetooth circuit 216, and a barcode scanner 224. NFC circuit 212 may be used to provide initial pairing between the reader and the driver's electronic device. Wi-Fi® (or Wi-Fi Direct) may be used for exchanging data between the reader and the driver's electronic device. Such Wi-Fi® connectively may be beneficial particularly for longer range communication. Bluetooth®, including Bluetooth low energy ("BLE"), may be used for data transmission between the reader and the driver's electronic device. Alternative forms of wireless communication circuitry may be included in a reader consistent with aspects of the present technology.

The reader 200 may include a display 218 which may display to the police officer (or other law enforcement personnel) the mDL and/or other information of a license holder upon capture of such information from the license holder's device or otherwise. The display 218 may permit a police officer to view a photograph taken with the reader 200 to ensure it is of sufficient quality and/or that it captured the desired information. Also, the display 218 may display operating information of the reader 200, such as the operating mode of the reader 200, and may allow for user interaction such as mode selection or other control of the reader 200. The display 218 may be positioned to not be obstructed when the reader 200 is held. The display 218 in some embodiments is not touch sensitive, and in other embodiments may be touch sensitive. In some embodiments, the display 218 has an area of at least 1 square inch. Such a size may provide sufficient area to display a driver's picture and information in a similar size quality as a physical DL. In some embodiments, the display 218 may have a high contrast display and/or an adjustable contrast display to allow for information to be viewed in bright and low light conditions. In embodiments in which a user collects multiple pieces of information (e.g., mDL, vehicle registration, vehicle insurance), the display 218 may show the user one or more (e.g., each) of these pieces of information responsive to user input.

The reader 200 may include buttons or touch-sensitive controls 220 permitting the police officer to control operation of the reader 200. Buttons may be tactile (e.g., clicky) to provide feedback to a user that a control has been entered to the reader. In some embodiments, the buttons and other controls of the reader may be compatible with gloved hands.

The reader 200 may optionally include a barcode scanner 224 when the reader is a dual-functionality reader configured to read both mDLs and physical driver's licenses, as described previously and further below. The barcode scanner may comprise, for example, a laser scanner or an imager for analyzing barcodes disposed on a physical license or on mobile devices. NFC circuit 212 and/or barcode scanner 224 may be used to provide initial pairing between the reader and the driver's electronic device. Such a barcode scanner may be configured to scan barcodes, such as PDF417 (or other symbologies), on physical driver's licenses, car registrations, and insurance documents. Alternatively, a barcode scanner may be configured to read a barcode on an mDL. In some embodiments, a barcode scanner may read a barcode as part of a pairing process for pairing the reader to the license holder's mobile device.

Furthermore, a reader may optionally include a camera 222. The camera may be used to capture photographs and/or video of a driver's license, an item of interest such as a vehicle or license plate, or a scene. In some embodiments, a camera may be used instead of a barcode scanner for capturing images, such as images for scanning a physical driver's license in a dual-functionality reader.

The reader 200, or alternative readers described herein, may optionally include feedback outputs such as speaker 226, haptic feedback 228, or visual indicators, such as light emitting diode (LED) indicators. The feedback outputs may be used to provide feedback to a user (e.g., police officer) regarding operation of the reader, data acquisition, or other functions or conditions.

While not illustrated, other components may optionally be included with the reader 200 or with other readers described herein. A reader such as reader 200, or alternative mDL readers described herein, may include a global positioning system (GPS) module for detecting and measuring location of the reader. Such measured location information may be linked with collected data and used to complete an incident report or for tracking of the reader, as examples.

The reader 200, or alternative readers described herein, may include a flashlight or other illuminator. The reader may be used in dark conditions, such as at night or in environments lacking natural or artificial lighting. The flashlight may facilitate use of barcode scanning of a physical driver's license, and/or photographing.

The reader 200, or alternative readers described herein, may include haptic actuators to generate haptic feedback to a user (e.g., police officer). For example, a haptic signal may be provided to a user to indicate successful capture of an mDL from a license holder's mobile device.

The reader 200, or alternative readers described herein, may include audible output devices, such as a speaker. The speaker may be used to provide feedback to a user (e.g., police officer), for example to indicate successful capture of an mDL from a license holder's mobile device. The audible output devices may also be used to provide instructions to the user.

The reader 200, or alternative readers described herein, may include an audio recording device, such as a microphone. The audio recording device may be used to record witness statements, police officer comments, environmental sounds, or other audio. Such captured audio may be linked to mDL information in a data record for transfer to a docking system in the manner described previously herein.

The reader 200, or alternative readers described herein, may include suitable software modules for operating the various hardware components illustrated and described above. For example, NFC, Wi-Fi®, Bluetooth®, barcode scanner, camera, USB communication, flashlight, power management, data storage and encryption, reader-to-dock and eCitation information transfer software modules may all be included with the reader, or some subset of such software modules may be included corresponding to those hardware elements included in the reader.

The reader 200, or alternative readers described herein, may also store various keys for validation and/or encryption purposes. As has been described, security of the mDL and related information may be maintained by utilizing encrypted communications and encryption at rest to temporally store data on the reader. Such functionality is facilitated by loading suitable encryption keys onto the reader. Such loading of keys may occur when the reader is docked in some embodiments.

Figure 3A:
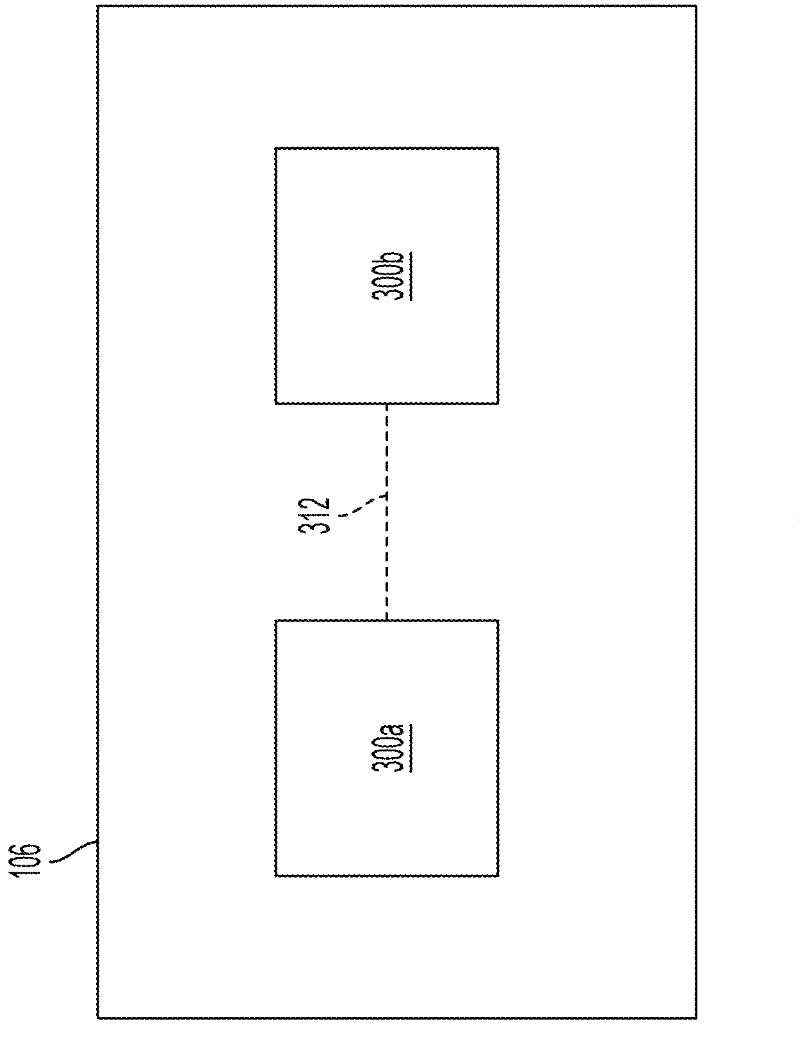
FIG. 3A is a block diagram of a docking system for docking a reader according to a non-limiting embodiment.

FIG. 3A is a block diagram of a docking system 106 for docking a reader according to a non-limiting embodiment. The docking system 106 provides mechanical docking functionality and computing functionality for use with the reader 104. As shown in FIG. 3A, the docking system 106 includes a dock 300*a* and a host 300*b* connected by communication link 312. In various embodiments, communication link 312 may comprise a physical connection such as a wire with connectors on each end or a data path between two modules of a circuit, a wireless link, or another communication link. Dock 300*a* is configured to couple with a reader 104 and transfer information between the reader 104 and the host 300*b*. In some embodiments, the dock 300*a* may provide mechanical docking functionality and may operate as a pass-through dock for communication between the reader 104 and the host 300*b*. Host 300*b* is configured to send and/or receive information to and/or from the reader 104 and process the information. Each of dock 300*a* and host 300*b* may include various functional modules described in further detail below, such as connectors, interfaces, processors (and associated memories) and/or power supplies.

Figure 3B:
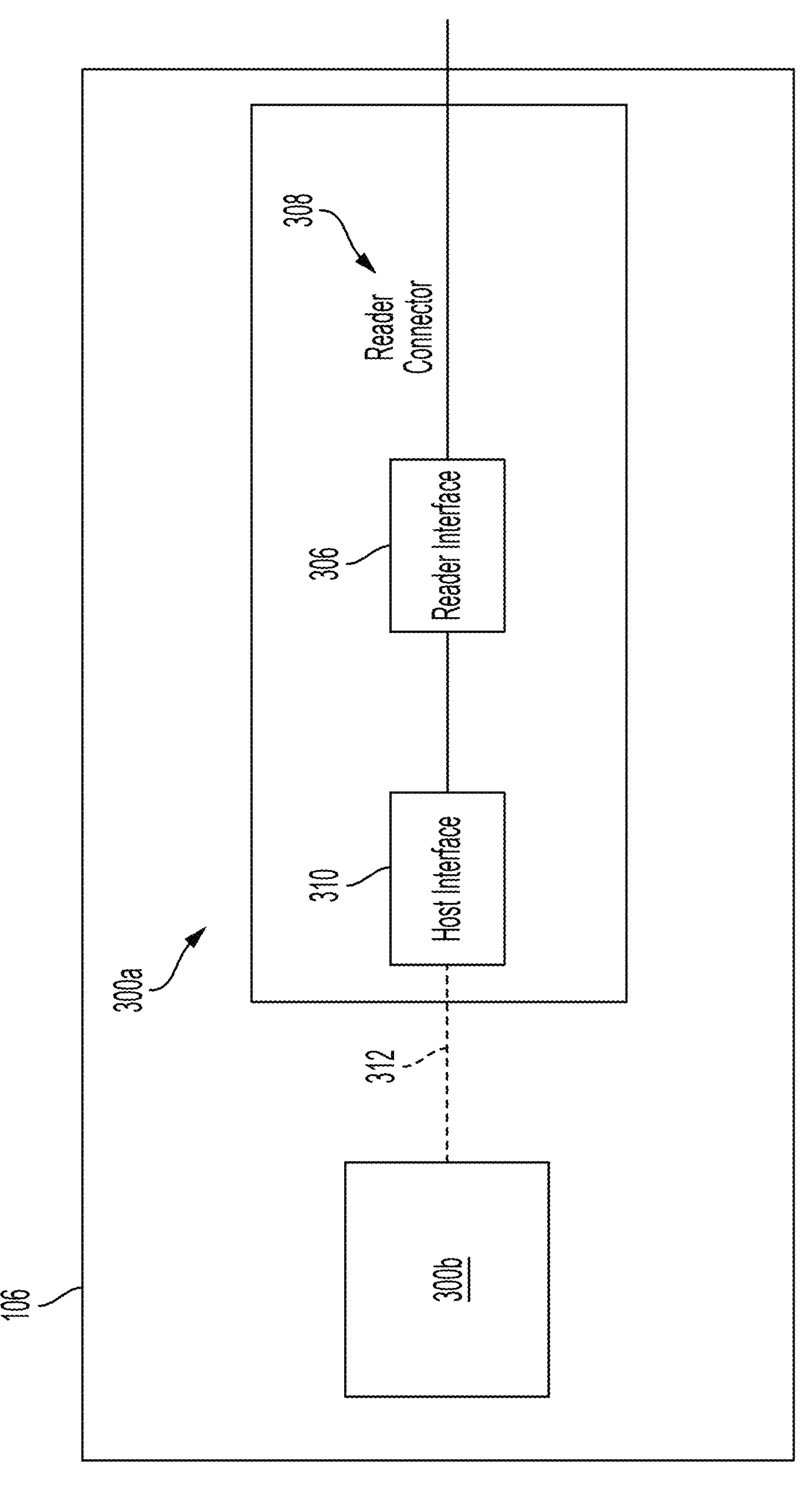
FIG. 3B is a block diagram of an implementation of the docking system of FIG. 3A according to a non-limiting embodiment.
Figure 3C:
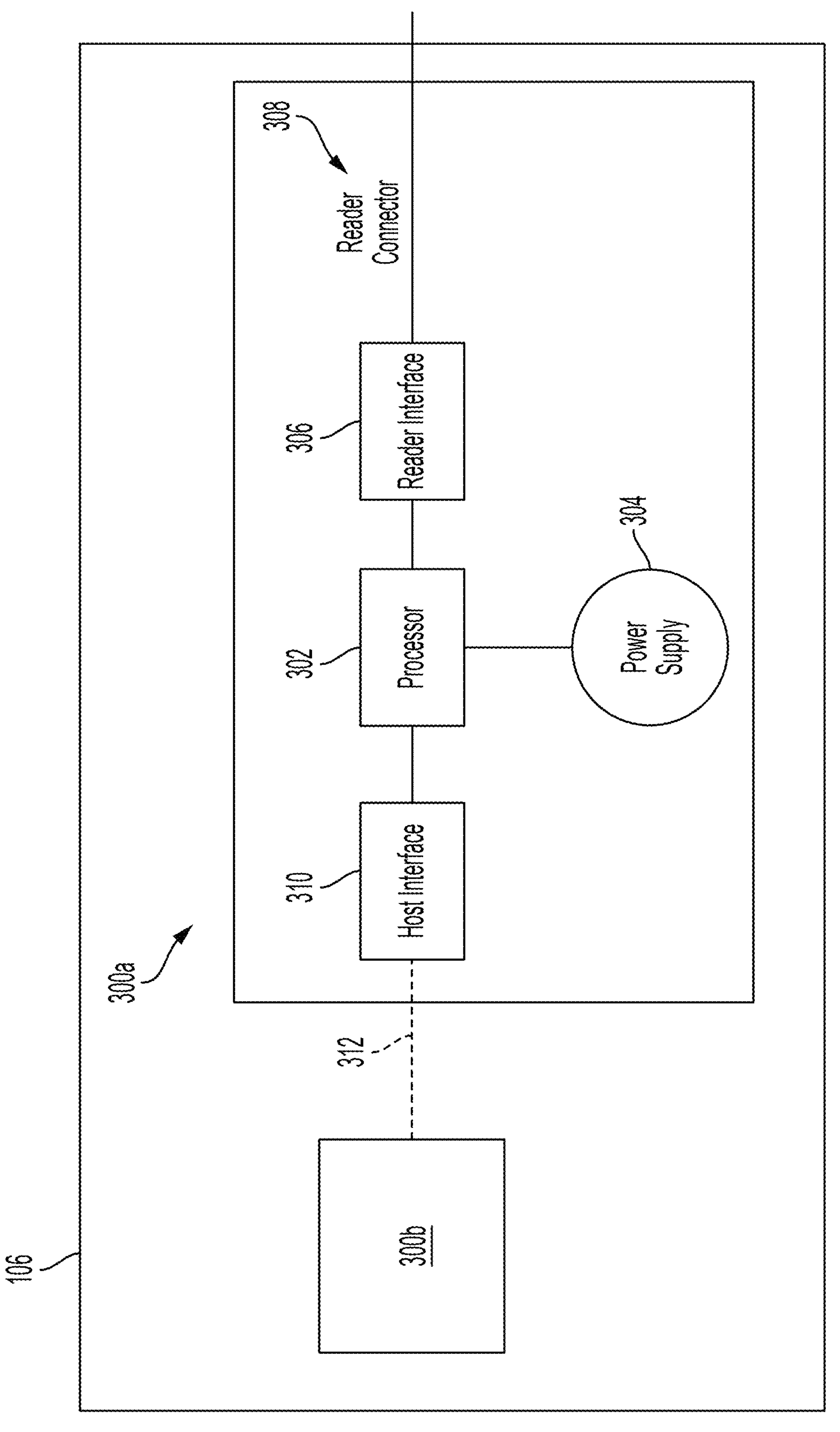
FIG. 3C is a block diagram of another implementation of the docking system of FIG. 3A according to a non-limiting embodiment.

In some embodiments, the dock 300*a* and the host 300*b* may be separate physical devices. In other embodiments, the dock 300*a* and host 300*b* may be integrated into a single physical device as the docking system 106. FIGS. 3B and 3C described below show merely two example arrangements of modules within dock 300*a* and host 300*b* of docking system 106.

In various embodiments, each of the modules described below may be arranged in either one of the dock 300*a* or the host 300*b*, and some examples are given below. For example, in some embodiments, dock 300*a* may include a processor which performs some processing or facilitates transfer of information from an mDL. In other embodiments, a dock may simply provide a connection between a reader 104 and a host 300*b*.

FIG. 3B is a block diagram of an implementation of the docking system 106 of FIG. 3A according to a non-limiting embodiment. In FIG. 3B, dock 300*a* includes a reader interface 306, a reader connector 308, and a host interface 310, and is coupled to host 300*b* via a communication link 312. In FIG. 3B, the dock 300*a* is configured to transfer mDL information between a reader 104 and a host 300*b*. As shown in FIG. 3B, the dock 300*a* may not include a processor, and may simply be used by the reader 104 and host 300*b* as a data link and for mechanical docking. In some embodiments, the dock may also charge the reader 104 wirelessly or via a physical connection (e.g., using (a) a cable or (b) a magnetic coupling in combination with external charging contacts).

FIG. 3C is a block diagram of another implementation of the docking system 106 of FIG. 3A according to a non-limiting embodiment. In FIG. 3C, the docking system 106 includes a processor 302, power supply 304, reader interface 306, reader connector 308, host interface 310, and is coupled to host 300*b* via a communication link 312. The dock 300*a* illustrate in FIG. 3C differs from that shown in FIG. 3B in that the dock 300*a* in FIG. includes a processor 302 (which may be accompanied by a power supply 304). The power supply 304 may be from the host 300*b* or with another power source, such as a vehicle. While the dock 300*a* in FIG. 3C may perform all of the processes described with respect to FIG. 3B, the dock of FIG. 3C may perform additional processes using the processor. For example, the dock 300*a* of FIG. 3C may store mDL or other data, perform local processing of information in an mDL (such as pre-processing, encryption, verification of a reader or eCitation application, or authentication of mDL information), may lock and/or unlock functions of a reader 104, among other data processing functions described herein with respect to the host 300*b*. Accordingly, FIG. 3C illustrates an embodiment where data processing may be split between the dock 300*a* and the host 300*b*. In the docking system 106, the processor 302 is configured to control the docking system's operation and may take any suitable form for doing so. For example, the processor 302 may be any of the types of processors described above in connection with processor 202 of FIG. 2. However, the processors 202 and 302 need not be the same type as each other. The processor 302 may provide greater processing capability than the processor 202, since the docking system may provide a wider range of functions in at least some embodiments. The processor 302 may include memory, or the docking system 106 may have separate memory with which the processor 302 communicates.

A docking system 106 may be powered by a power supply 304. The power supply 304 may be the police car in which the docking system sits or may be the host 300*b*. If the docking system 106 is not in a police car, then an alternative form of power may be used.

A docking system 106 includes a reader interface 306 for interfacing with a reader, such as the reader 104 or reader 200. In the illustrated embodiment, the reader interface 306 may be a USB interface, and the docking system 106 may connect to a connector 308 which may be a USB connector. The connector 308 may be the same connector as connector 210 of FIG. 2. The connector 308 may be removably attached to the docking system and/or reader.

A docking system 106 includes host interface 310 for connecting the docking system to the police car ("patrol car"), for example to a personal computer (PC) of the police car. A communication link 312, such as a connector, may be provided from the docking system 106 to the host 300*b*, e.g., a PC of the police car or another host. In some embodiments, the host interface 310 may be a USB interface and the communication link 312 may be a USB connector. The host interface may be used for data transfer between the docking system and the police car personal computer, and for firmware updates to the docking system.

It should be appreciated that the illustrated connections of the docking system to the reader and to the patrol car may be wired connections in some embodiments, such as USB connections, or may be wireless connections in alternative embodiments.

As should be appreciated from the foregoing description, the docking system 106 may communicate with the reader to receive the mDL information and/or other information stored on the reader. In some embodiments, upon docking the reader to the docking system, communication between the two is activated. The docking system 106 may receive the information from the reader in any suitable manner and store the information or provide the information to a host PC or other computing system component.

Figure 4A:
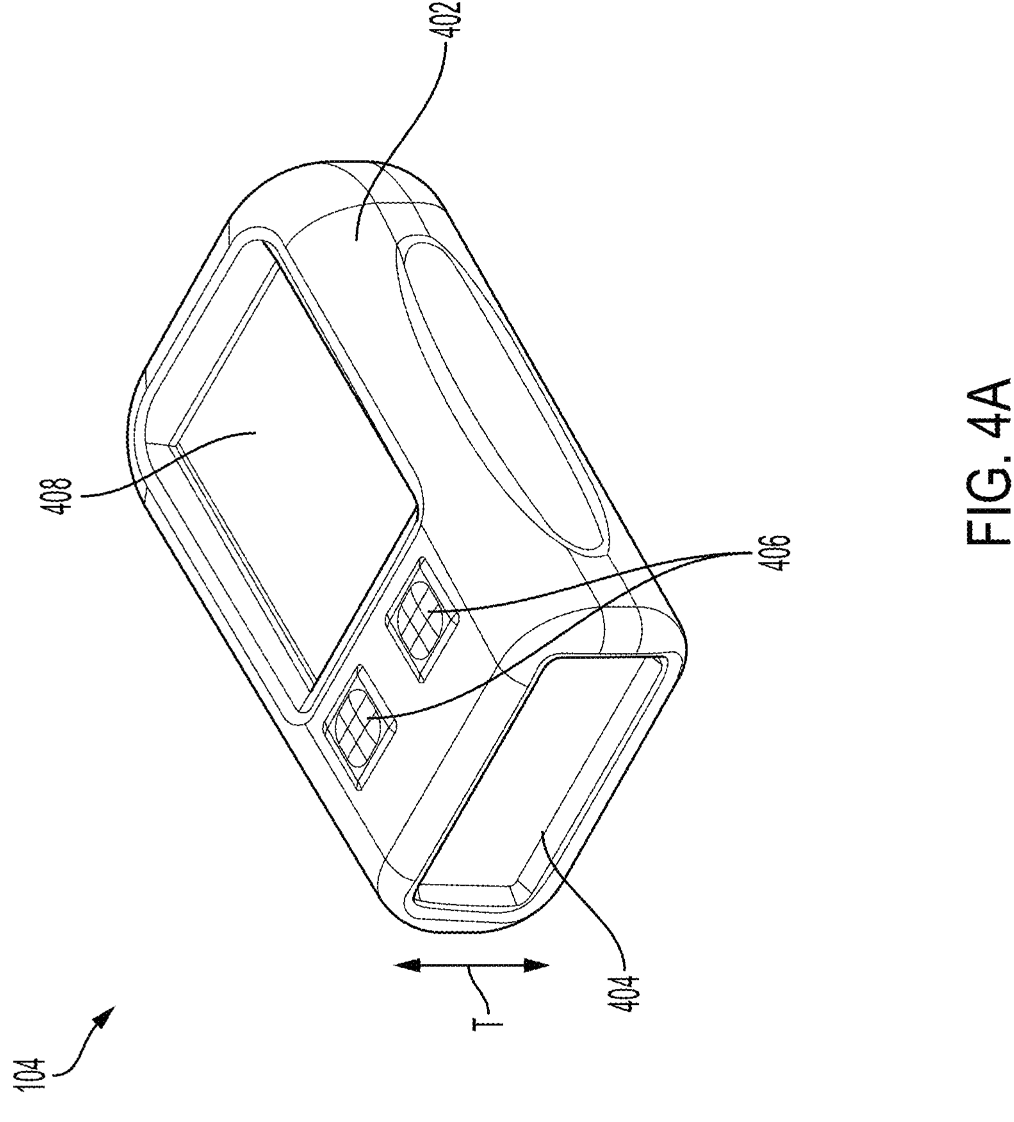
FIG. 4A is an example form factor for a reader according to a non-limiting embodiment.
Figure 4B:
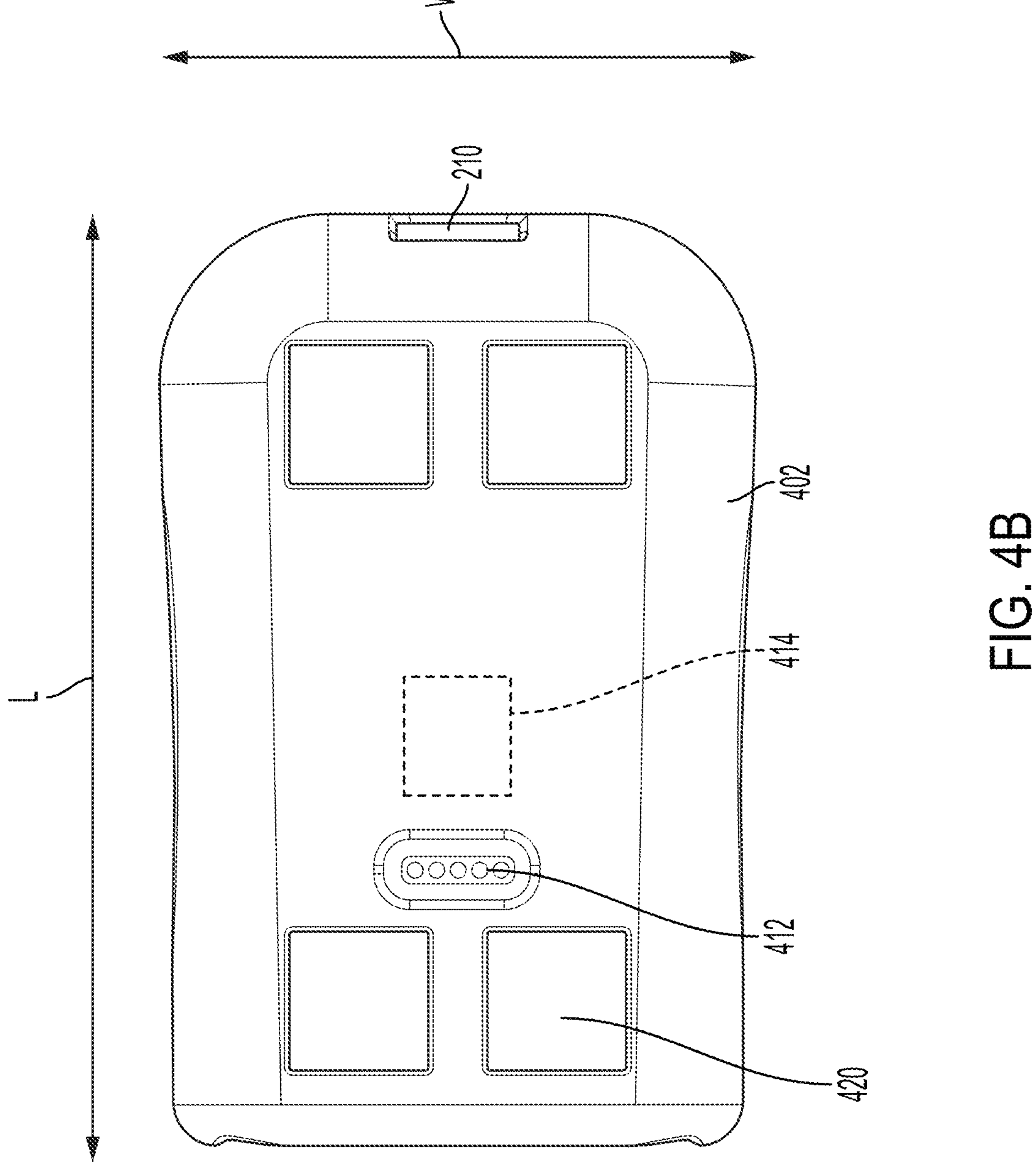
FIG. 4B illustrates a backside of the reader of FIG. 4A.
Figure 4C:
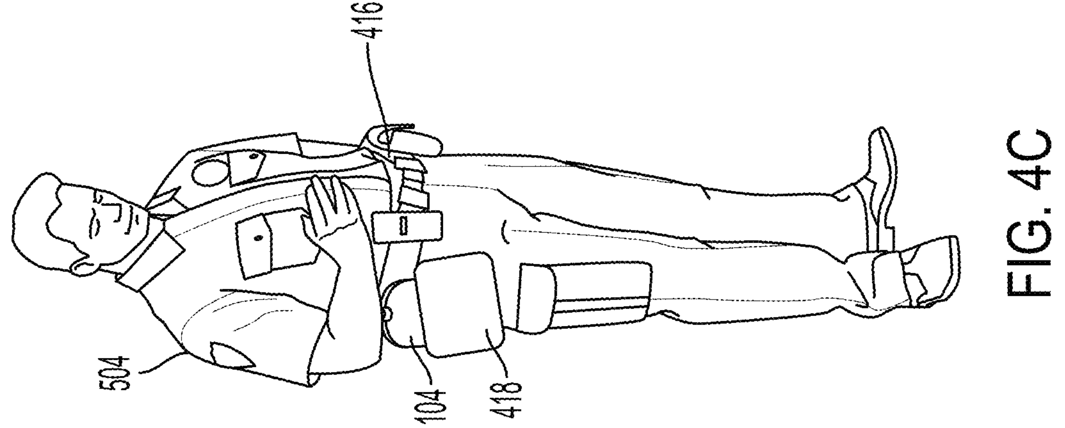
FIG. 4C illustrates the reader of FIG. 4A in a holster worn on the body of a user.
Figure 4D:
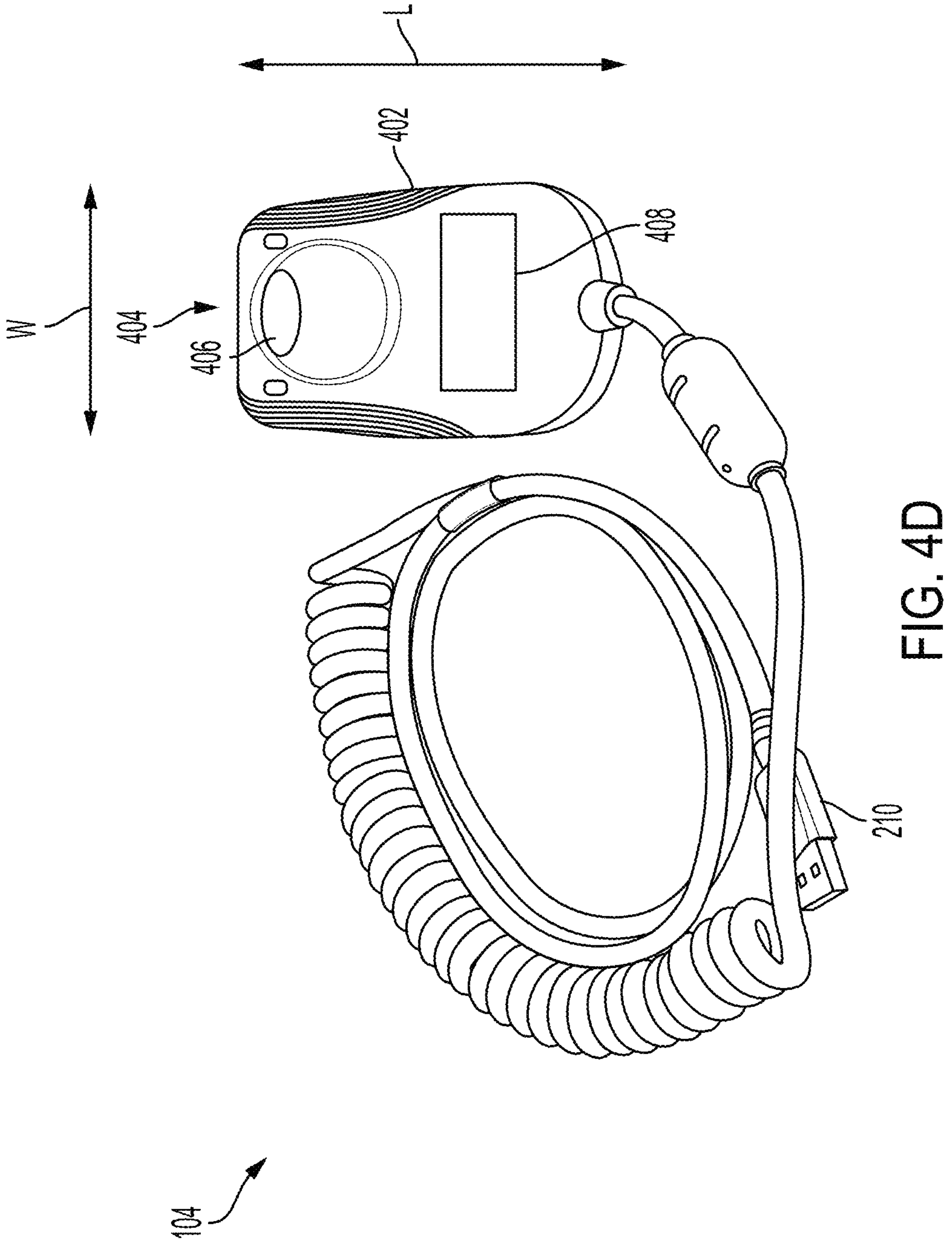
FIG. 4D is another example form factor for a reader according to a non-limiting embodiment.

FIGS. 4A and 4D show an exemplary form factors of the reader 104 according to a non-limiting embodiment. Other form factors are possible, and thus the form factor illustrated in FIGS. 4A and 4D are non-limiting. The reader 104 includes a housing 402, scanning face 404, control button(s) 406, and display 408. The reader may include a connector 210.

As described previously herein, readers according to embodiments of the present technology are portable and may be handheld. Accordingly, the housing 402 is sized to be handheld. For instance, the housing 402 may have a length L between 3-6 inches, a width W between 1.5-5 inches, and a thickness T between ½ inch to 2.5 inches. The housing may also be shaped to be ergonomic, and to allow for use by one hand. The housing 402 may also render the reader 104 water resistant (or waterproof), temperature resistant, and drop resistant. In some embodiments, the housing 402 is made of plastic. In some embodiments, internal components of the reader 104 may be compatible with a plurality of different housings such that the housing of the reader may be customized based on user preference or other parameters.

The readers 104 illustrated in FIGS. 4A and 4D includes a scanning face 404. The scanning face 404 may be the portion of the reader 104 at which the wireless and/or optical scanning technology resides to wirelessly communicate with a license holder's mobile device to read an mDL or for scanning a physical driver's license. Thus, the user of the reader 104 may point the scanning face 404 toward the license holder's mobile device (e.g., electronic device 102 of FIG. 1) or physical driver's license to capture the driver's license information.

The readers 104 illustrated in FIGS. 4A and 4D includes one or more control buttons 406 (e.g., two buttons) which may be used to control operation of the reader, including functions such as on/off, mode selection, and activation of a reading session. For example, one button may function as an on/off button and another button may activate the reader 104 to capture mDL information. The control buttons 406 may take any suitable form, and in alternative embodiments may be switches, sliders, knobs, or other suitable means for controlling operation of the reader.

The housing 402 includes a display 408 to display an mDL or other information to a user. For example, the display 408 may display operating mode of the reader, including an indication of whether the reader is activated to read an mDL or a physical driver's license. For example, using the display 408 and/or the control button(s) 406, the device may be used to toggle between different capture modes of the reader 104, and to trigger the reader to do one or more of: (a) request data wirelessly in a manner outlined in an accepted protocol for government-issued electronic identification, such as ISO/IEC 18013-5; (b) read a PDF417 barcode from a physical driver's license; (c) capture an image of a physical driver's license; or (d) capture other documents or details of the scene.

The readers 104 in the non-limiting example of FIGS. 4A and 4D also includes a connector 210, and there may be a complementary cable for connecting the reader to a docking system as described previously herein. For example, in embodiments where the docking system comprises a single device, the connector 210 may be used to connect reader 104 directly to that single device. However, the cable is optional, as the reader may lack any such cable in some embodiments and instead may be fully wireless.

FIG. 4B illustrates a non-limiting example of the backside of the reader 104 shown in FIG. 4A. As shown, the reader 104 may include a docking connector 210, docking connector 412, an NFC circuit 414, and a retention member 420. Docking connector 412 may comprise a pogo pin or similar style connector disposed on the housing, which is configured to be brought into contact with a complementary connector of the dock when the retention member is engaged. In the embodiment of FIG. 4B, the retention member 420 comprises a magnetic coupling which may comprise a set of one or more magnets. In other embodiments, the retention member may comprise a clip, one or more snap fit members, a button, one or more friction fit members, or other structure for fixing the reader 104 in place when mounted with a docking system or a holster. The NFC circuit 414 may be used for unlocking the reader 104, as described below. The dock may have a complementary retention member, such as a complementary set of magnets.

Figure 4E:
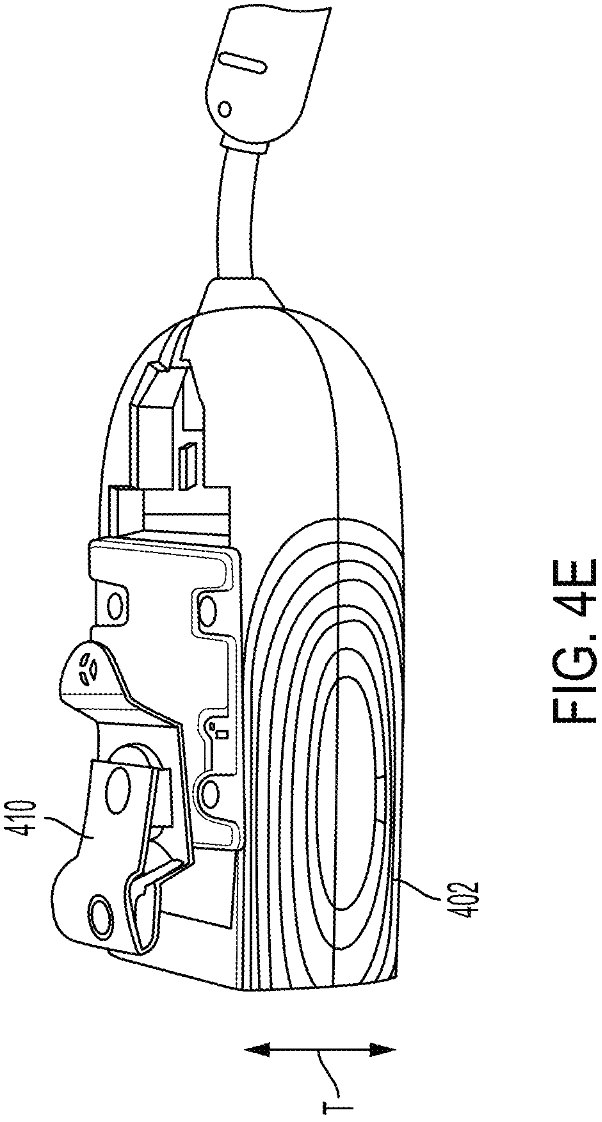
FIG. 4E illustrates a backside of the reader of FIG. 4D.

FIG. 4C illustrates the reader of FIG. 4A disposed in a holster worn on the body of a user. As shown in FIG. 4C, a user 504 may wear a belt 416, and may have a holster 418 coupled to the belt. In other embodiments, the holster 418 may be coupled to the person of user 504 in another manner, such as by attaching it to a piece of the user's clothing or to another item worn by the user. The reader 104 may be retained in the holster 418. The reader 104 may include a retention member and the holster 418 may include a complementary retention member configured to engage with the retention member. As described herein, the holster may include an NFC tag configured to perform various functions, such as unlocking the reader after it has been locked. FIG. 4E illustrates a non-limiting example of the backside of the reader 104 shown in FIG. 4D. As shown, the reader 104 may include a clip 410 proximate the housing 402. The clip 410 permits the reader 104 to be clipped to a belt, a docking system, or other location of interest. Alternatives to a clip may be implemented in alternative embodiments. For example, a snap fit, button, friction fit, magnetic coupler, or other structure may be used to fix the reader 104 in place when being worn or mounted.

Accordingly, readers described herein may provide a highly functional yet simple device. The simplicity of the readers described herein therefore allow law enforcement personnel and other users to easily use and reliably depend on the readers in challenging and varied conditions. For example, as should be appreciated, the readers described herein may lack complex features of cell phones and other handheld devices (large touch screens, a large number of applications, QWERTY keyboards) and may lack complex features of other larger devices such as full sized laptops or computers (full-sized QWERTY keyboards, mice, lots of buttons), Accordingly, the reader provides simplicity and may be used in varied, and sometimes harsh conditions. As an example, having a small number of input sources allows the reader to be operated in the cold (e.g., with gloves on), quickly and easily operated by the side of the road with passing cars, operated in low or no light situations such as might occur outdoors at night, or in certain environment that are intentionally not lit, such as the interior of a police cruiser. Additionally, the form factor and simplicity of the readers provides the ability for a user to quickly grab the reader, hold it up, and in a single or small number of button presses, capture the information and quickly return to a vehicle.

The simplicity of the device may also provide enhanced safety for users. For example, because readers described herein provide rapid use, user safety can be enhanced in various types of situations in which the reader might be used. For example, the reader may be operated in dangerous conditions such as by the side of the road, at night, in extreme weather, or in hostile environments. Thus, simple and quick use of the device to collect the desired identification information permits the user to return to a safer environment more quickly.

The simplicity of readers may also provide a low price point. For example, readers may use less expensive parts (e.g., lacking the level of memory of a general purpose device).

In some embodiments, readers may lack internet connection. The lack of internet connection of the device may focus use of the reader by users, ensuring the user is not distracted by the internet.

In some embodiments, the communication routine between a reader and an electronic device may be initiated and performed in response to a single button press (or a single activation signal). For example, in response to a single button press (or in some embodiments, a small number of presses, such as two or three button presses) or an activation signal (from a user input such as a button press), the reader may execute a communication sequence to capture the mDL from an individual's electronic device. The communication sequence may include all steps of an electronic identification scanning process specified by an accepted protocol for government-issued electronic identification, such as the ISO/IEC 18013-5 standard. In some such communication sequences, such as in the example of operating in compliance with ISO/IEC 18013-5 standard, the sequence may include steps of a handshake communication and exchange of data. After the communication sequence, the user may be provided with feedback, such as a haptic response, audible response, or visual response (e.g., displaying the captured information on a display of the reader) indicating that the initiated capture is completed and letting the user know they are done and can proceed with scanning a different electronic identification (e.g., license) or heading back to their vehicle. Displaying the captured information on the display of the reader allows the user to verify the information has been captured to their satisfaction.

As has been described, some embodiments provide a dual-functionality reader which may be used both to read an mDL and to read a physical driver's license. Those two operations are illustrated and described in connection with FIGS. 5A-5C.

FIG. 5A illustrates the use of a reader 104, which may be a dual-purpose reader operable as both a mobile driver's license reader and a physical driver's license reader, to read a mobile driver's license according to a non-limiting embodiment. FIG. 5A illustrates a scene in which a police officer is the user 504 of the reader 104. The police officer, with vehicle 506, is conducting a traffic stop with driver 512 of vehicle 510. As shown, the user 504 holds the reader 104 proximate the electronic device 102 storing the mDL without requiring the driver 512 to surrender the electronic device 102 to the user 504. The user 504 may activate the reader 104 by pressing a control button with his/her thumb, or in another suitable manner. The reader 104 then uses wireless link 108 to communicate with the electronic device 102 and receive the mDL with the information of driver 512. That information is stored in the reader until transferred to the docking system 106 using a link such as link 110 as described previously. The docking system 106 may be mounted in the vehicle 506, such that the vehicle 506 may be a docking vehicle for the reader 104.

Figure 5B:
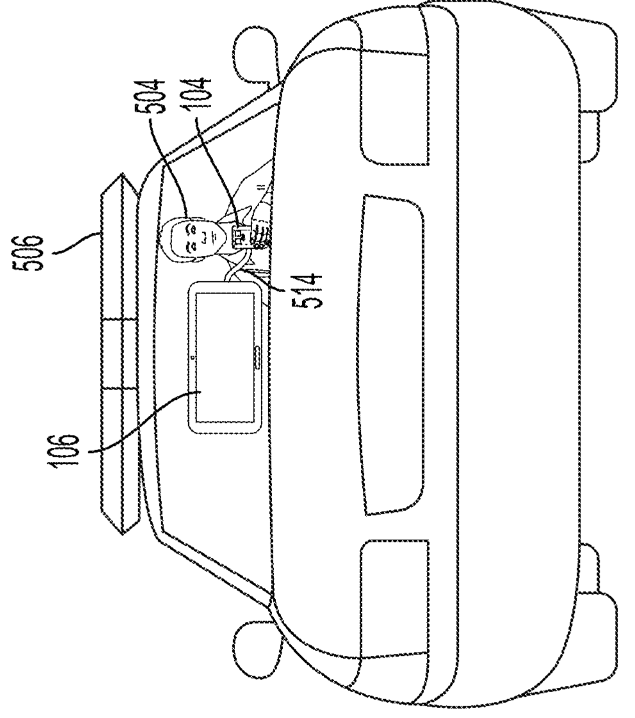
FIG. 5B illustrates use of a dual-purpose reader for mobile driver's licenses and physical driver's licenses in transferring a mobile driver's license to a docking system according to a non-limiting embodiment.

FIG. 5B illustrates the use of a reader 104, which may be a dual-purpose reader operable as both a mobile driver's license reader and a physical driver's license reader, in transferring a mobile driver's license to a docking system according to a non-limiting embodiment. The scene illustrated in FIG. 5B may occur after the scene illustrated in FIG. 5A. As shown in FIG. 5B, after user 504 (e.g., the police officer) uses reader 104 to receive the mDL from the electronic device 102, the user 504 may return to the vehicle 506. The user 504 may then couple the reader 104 to the docking system 106. In FIG. 5B, the reader 104 is connected to docking system 106 using physical connection, here cable 514, though other couplings (such as wireless connections) may also be used. In some embodiments, a holder of an electronic of physical identification may also enter the vehicle 506 during the data transfer process (e.g., to facilitate the data transfer process or for procedural reasons). In some embodiments, the reader 104 may be coupled to the docking system 106 even when the user 504 is not in the vehicle. For example, the reader 104 may be wirelessly connected to the docking system 106 with a connection range sufficient to remain connected throughout a traffic stop, such as a range of 20, 50, or 100 feet, or greater.

When the reader 104 is coupled with the docking system 106, one or more mDLs previously received by the reader 104 may be transferred to the docking system 106. For example, the reader 104 may automatically transfer the mDLs upon connection, or the user 504 may operate a control on either or both of the docking system 106 or reader 104 to initiate the transfer. For example, the reader 104 may transfer all mDLs received by the reader since the last time the reader 104 was coupled to the docking system. Accordingly, in embodiments where the reader 104 is configured to receive and store multiple mDLs, the reader 104 may transfer multiple mDLs in a single coupling session. After one or more mDLs are transferred to the docking system 106, the docking system may execute further processing on each mDL as described throughout the disclosure, and the user 504 may proceed with remaining steps of the traffic stop.

Figure 5C:
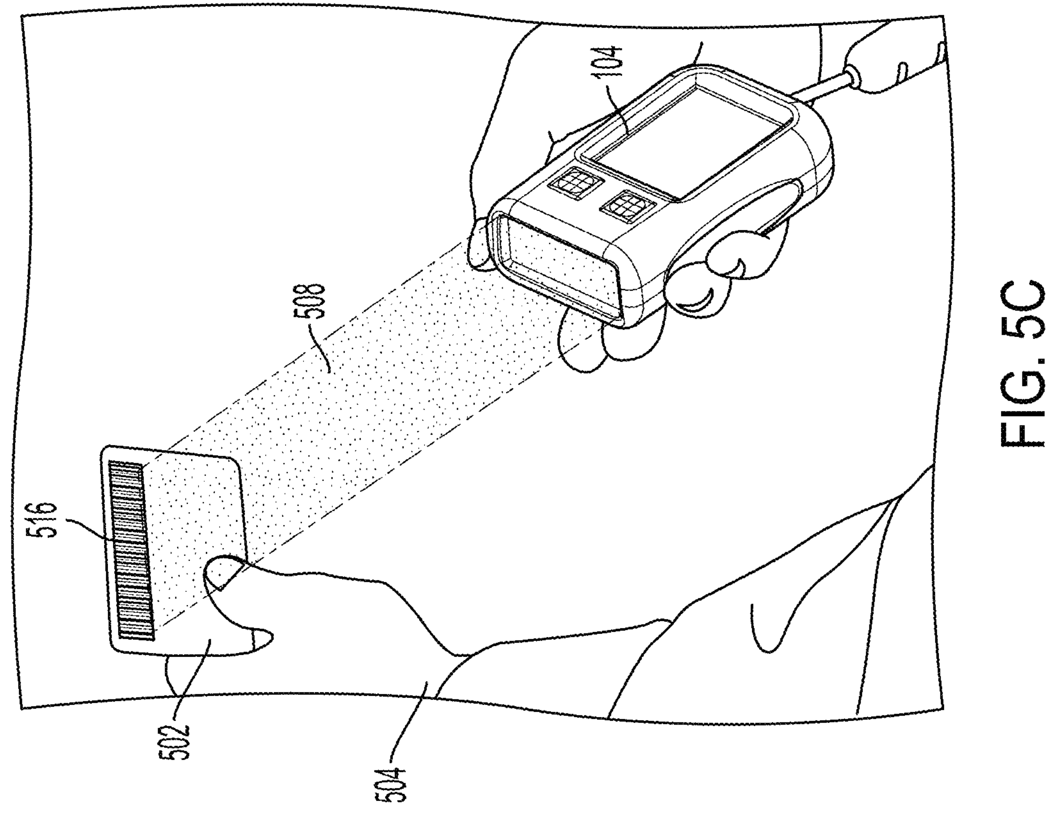
FIG. 5C illustrates use of a dual-purpose reader for mobile driver's licenses and physical driver's licenses in reading a physical driver's license according to a non-limiting embodiment.

FIG. 5C illustrates the use of a reader 104, which may be a dual-purpose reader operable as both a mobile driver's license reader and a physical driver's license reader, for reading a physical driver's license 502 according to a non-limiting embodiment. As shown, the user 504 (e.g., a police officer) holds the physical driver's license 502 in front of the scanning face of the reader and activates the reader by pressing the control button with his/her thumb. The reader then uses optical scan 508 to optically scan a barcode 516 on the driver's license 502 to acquire the driver's information. That information is stored in the reader under transferred to the docking system as described previously.

More generally, the reader can collect an individual's information by scanning the PDF417 barcode on the physical driver's license or by taking a picture of the driver's license. The scanned data is transferred from the reader through a physical connection to a mobile computer located inside a patrol vehicle and gets populated into the department-chosen software (e.g., eCitation software, warrant software, crash reporting software, or other application) allowing an officer to complete an error-free report or task with ease.

Figure 6:
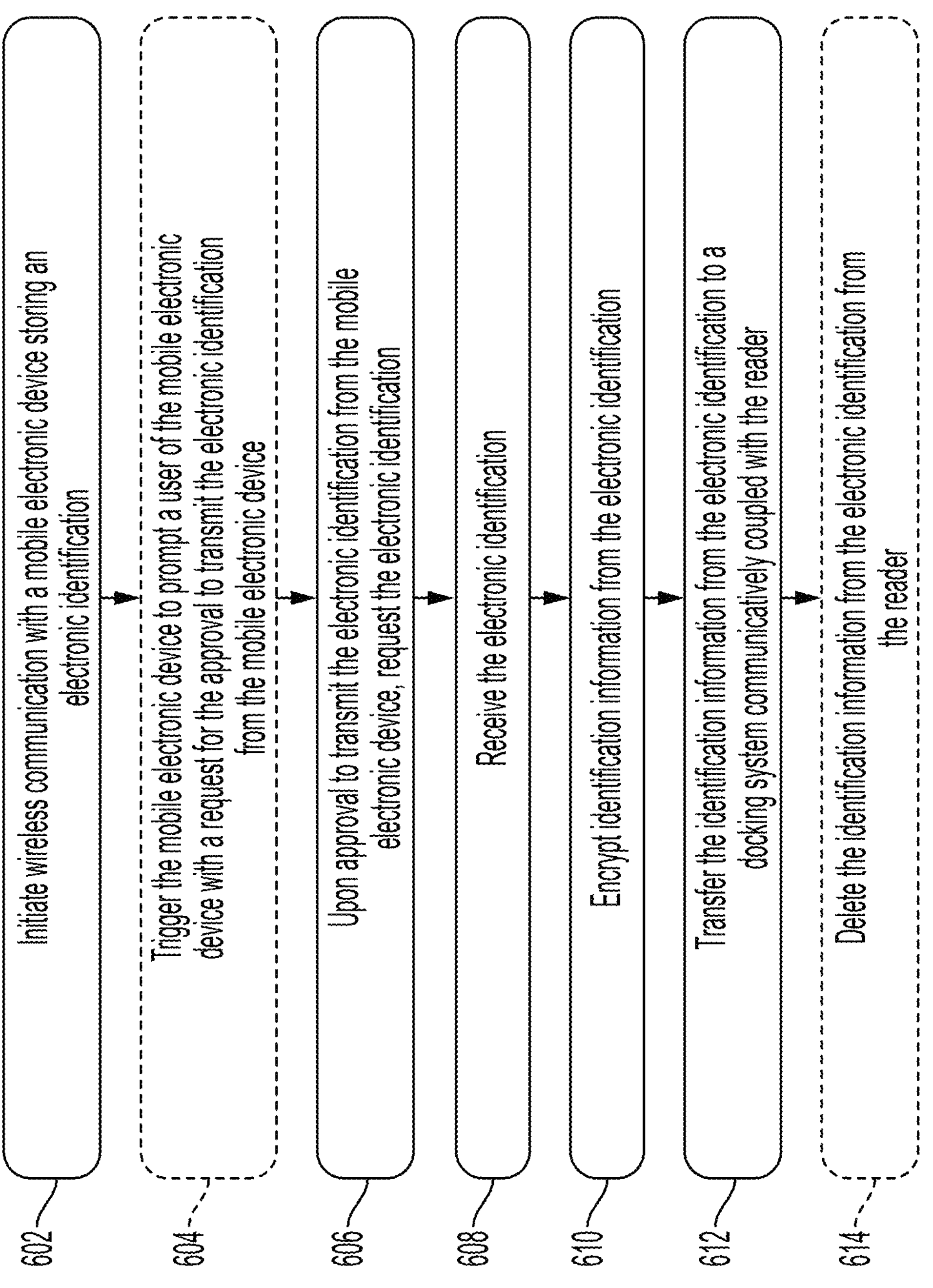
FIG. 6 is an example process flow for a method of collecting information of a mobile driver's license using a reader according to a non-limiting embodiment.

FIG. 6 is an example process flow 600 for a method of collecting information of an electronic identification using a reader of the types described herein, according to a non-limiting embodiment. Process flow 600 may include step 602, optional step 604, step 606, step 608, step 610, step 612, and optional step 614. In the process flow 600 of FIG. 6, the electronic identification may be a government-issued electronic identification.

In the process flow 600 of FIG. 6, a reader and a mobile electronic device may communicate and transfer data in compliance with an accepted protocol for government-issued electronic identification such as the ISO/IEC 18013-5 standard. For example, with respect to the ISO/IEC 18013-5 standard, the reader and mobile electronic device may use a standard-compliant handshake process. In some embodiments, the reader is configured as and operate as a server for purposes of the communication.

At step 602, the reader initiates wireless communication with a mobile electronic device storing an electronic identification (such as an mDL). This may be done in the manner described previously herein for reader 104, as an example. In some embodiments, step 602 may comprise performing a handshake compliant with an accepted protocol for government-issued electronic identification, such as ISO/IEC 18013-5.

At optional step 604, the reader triggers the mobile electronic device to prompt a user of the mobile electronic device with a request for the approval to transmit the electronic identification from the mobile electronic device. For instance, the mobile electronic device may be a smartphone and the reader may trigger the smartphone to generate a visual request to the smartphone owner—the license holder in this example—to allow transmission of the electronic identification to the reader. For instance, the license holder may see a request appear on the display of the smartphone. The approval may be granted by the license holder in a suitable manner, such as by pressing a selection option on the display of the smartphone. Step 604 is optional because in some embodiments the mobile electronic device may automatically approve transfer of information without prompting the electronic identification holder.

At step 606, the reader, upon approval to transmit the electronic identification from the mobile electronic device, requests the electronic identification. In those embodiments in which optional step 604 is not performed, the process may simply go from step 602 to step 606 to request transmission of the electronic identification.

At step 608, the reader receives the electronic identification. As described previously, this may be accomplished wirelessly. The reader need not contact the mobile electronic device, and the police officer, or other user, need not handle the mobile electronic device. The electronic identification may be received via a secure wireless link in at least some embodiments. Step 608 may include receiving the electronic identification in a transmission format compliant with an accepted protocol for government-issued electronic identification, such as ISO/IEC 18013-5.

At step 610, the reader encrypts identification information from the electronic identification, as described previously herein. As a result, the electronic identification information may be encrypted at rest on the reader, providing enhanced security and reducing the risk of unintended disclosure of the electronic identification. Step 610 may include encrypting information from the electronic identification in a format compliant with an accepted protocol for government-issued electronic identification, such as ISO/IEC 18013-5.

At step 612, the reader transfers the encrypted (or in some embodiments, unencrypted) identification information it received from the electronic identification to a docking system communicatively coupled with the electronic identification reader.

At optional step 614, the reader deletes the electronic identification information. As described previously, such operation of the reader may enhance security and boost confidence from the public in the use of electronic identifications and electronic identification readers.

Aspects of the present technology provide various benefits. Some such benefits have been described, and some are now listed. It should be appreciated that not all embodiments necessarily provide all benefits, and that benefits other than those listed may be realized as well.

Aspects of the present technology provide a dual-use driver's license reading system configured for scanning a conventional physical driver's license (DL) and also configured for reading an mDL. The reading system may therefore operate in various jurisdictions, including those that use physical driver's licenses and those that use mDLs and may provide flexibility to users such as police officers. The driver's license reading system may be compact and lightweight, making it easy for a police officer or other user to carry and manipulate the driver's license reading system. The driver's license reading system may include long battery life and be tolerant to a wide range of conditions such as might be experienced by a police officer in the field. The driver's license reading system may provide secure reading and storage of mDL information, facilitating adoption of mDL technology by reducing data privacy concerns.

Aspects of the present technology permit a police officer to gather all needed information from an individual's documents, such as a driver's license, car registration, and insurance form, without having to handle such documents or handle a mobile device storing such documents. In this manner, the police officer may avoid handling a driver's personal items while still being able to collect relevant information and transfer such information to a secure computer system.

The reader devices described herein may be used to collect information from multiple driver's licenses of different types at once. In some scenarios, a police officer may encounter multiple individuals and want to collect identification from them at once without having to take a break in between each one to return to a patrol car to record the information. Since some driver's might have mDLs and some might have physical driver's licenses, the readers according to some embodiments may be able to collect information from both types, and from multiple individuals before the information is transferred off the reader. In some embodiments, data from either or both electronic and physical identification may be collected and encrypted on the reader. In contrast, conventional readers may not encrypt data from physical devices because the data is not stored in the conventional reader. The information of the different individuals may be logically separated and stored within the reader in a manner that allows for the information of different individuals to remain separated when transferred off the reader to a docking system, or for the information of different individuals to be selectively transferred.

The reader devices described herein may provide informed use by providing feedback to a user. The feedback may be visual, auditory and/or haptic. The feedback may relate to various functions of the reader, such as whether the reader is wirelessly connected to a driver's electronic device, whether the reader mode has been changed, whether the reader has been triggered to read an mDL or capture other information, whether data transfer has completed successfully, or whether there has been error.

The reader devices described herein may operate in offline environments. Such functionality permits use in scenarios in which a police officer is not at an Internet-connected location.

The reader may comply with various standards. For example, as has been described, the reader device may communicate wirelessly with a driver's electronic device storing an mDL and may do so in a manner compliant with an accepted protocol for government-issued electronic identification, such as ISO/IEC 18013-5.

The reader may interface (device engagement) with an mDL and conduct offline retrieval via: Bluetooth, Wi-Fi Aware (Direct), and/or NFC. The reader may interface (device engagement) with an mDL and conduct online retrieval via: Internet (Web API) and/or Internet (OIDC). As discussed above, the reader may interface with an mDL to support the selective release of mDL data to the reader.

Once an mDL is received by a reader, the mDL may be verified. A verification process may be separate from a reading process. The verification process may use a certificate downloaded from a government agency (e.g., a federal or state agency). Accordingly, prior to receiving mDLs using the reader, law enforcement personnel may download certificates or verification keys for the relevant states (e.g., in some embodiments, certificates for a single state that state, in some embodiments, multiple states if they are in a region of multiple states, or in some embodiments all available certificates). When an mDL is received, the reader may then verify the accuracy of the mDL using the certificate. In some embodiments, the reader uses verification keys from a government authority to verify the mDL on the reader itself, without having to send information of the mDL off the reader to obtain verification. Furthermore, the certificates and verification keys may can be updated when the reader is connected to the dock. In other embodiments, the mDL may be verified by communicating with the state agency.

The reader may include an mDL verifier or enable communication with a remote mDL verifier to request, receive, and verify the integrity and authenticity of an mDL whether online connectivity is present or not on either the mDL or reader. Accordingly, the reader may enable an mDL Verifier, not associated with the issuing authority, to verify the integrity and authenticity of an mDL. The reader may also enable an mDL Verifier to confirm the binding between the person presenting the mDL and the mDL Holder.

Various embodiments of the present technology have been described. However, alternative embodiments consistent with aspects of the present technology are possible. Non-limiting additional exemplary embodiments are described below.

Example A1. A mobile driver's license reader, comprising: a handheld housing; a wireless communication module disposed within the handheld housing and configured to communicate wirelessly with a mobile electronic device storing a mobile driver's license (mDL) to receive the mDL from the mobile electronic device.

Example A2. The mobile driver's license reader of example A1, further comprising a barcode scanner configured to scan a barcode on a physical driver's license.

Example A3. The mobile driver's license reader of example A1, further comprising a wired connection configured to connect to a dock.

Example A4. The mobile driver's license reader of example A1, further comprising a camera configured to take a photograph.

Example A5. The mobile driver's license reader of example A4, wherein the camera is configured to take a photograph of a barcode on a physical driver's license.

Example A6. The mobile driver's license reader of example A1, configured to wirelessly connect to a dock.

Example B1. A method of reading a mobile driver's license, the method comprising: initiating wireless communication with a mobile electronic device storing a mobile driver's license (mDL); upon approval from the mobile electronic device, request the mDL; receiving the mDL; and encrypting the mDL.

Example C1. A mobile electronic device storing a mobile driver's license (mDL), comprising a wireless communication circuit configured to establish a wireless communication channel with an mDL reader and to transfer the mDL to the mDL reader.

Example C2. The mobile electronic device of example C1, further comprising a user interface configured to ask a user of the mobile electronic device for approval to transfer the mDL to the mDL reader.

Example D1. A method of transmitting a mobile driver's license (mDL) to an mDL reader, comprising: receiving a request from the mDL reader to establish a wireless communication channel; and transmitting the mDL to the mDL reader.

Example D2. The method of example D1, further comprising: prompting a user to approve transmission of the mDL to the mDL reader; and in response to receiving user approval, transmitting the mDL to the mDL reader using an encrypted communication protocol.

In some embodiments, a non-transitory computer readable storage medium is provided, storing processor-executable instructions which, when executed by a processor, perform the methods described herein. For example, a computer readable storage medium may store instructions which, when executed by a processor of the components described herein, may perform the methods described herein. Examples of computer readable storage media include solid state memory, disks, tapes, and flash drives or those examples described above.

Figure 7:
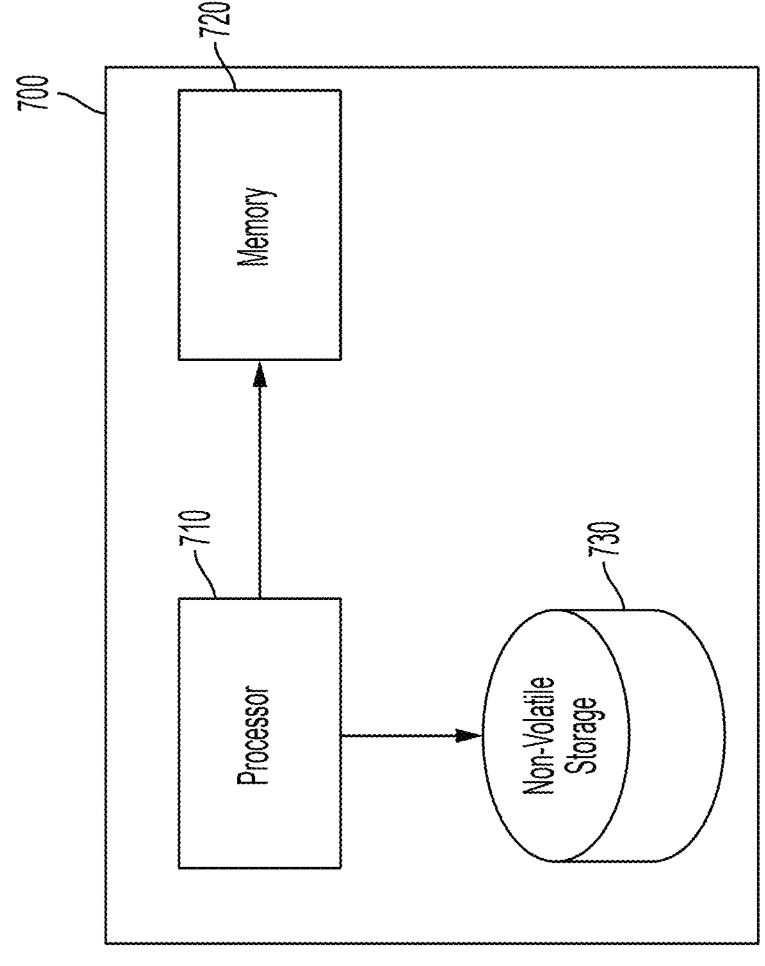
FIG. 7 shows an exemplary block diagram of a special purpose computer system that can be improved over conventional implementations based on implementations and/or execution of methods discussed herein.

For example, an illustrative implementation of a computer system 700 that may be used in connection with any of the embodiments of the disclosure provided herein is shown in FIG. 7. The computer system 700 may include one or more processors 710 and one or more articles of manufacture that comprise non-transitory computer-readable storage media (e.g., memory 720 and one or more non-volatile storage media 730). The processor 710 may control writing data to and reading data from the memory 720 and the non-volatile storage device 730 in any suitable manner. To perform any of the functionality described herein, the processor 710 may execute one or more processor-executable instructions stored in one or more non-transitory computer-readable storage media (e.g., the memory 720), which may serve as non-transitory computer-readable storage media storing processor-executable instructions for execution by the processor 710. When executed, the one or more processor-executable instructions may cause the processor 710 to carry out various steps described herein.

One or more aspects and embodiments of the present disclosure involving the performance of processes or methods may utilize program instructions executable by a device (e.g., a computer, a processor, or other device) to perform, or control performance of, the processes or methods. In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other tangible computer storage medium) encoded with one or more programs that, when executed on one or more computers or other processors, perform methods that implement one or more of the various embodiments described above. The computer readable medium or media can be transportable, such that the program or programs stored thereon can be loaded onto one or more different computers or other processors to implement various ones of the aspects described above. In some embodiments, computer readable media may be non-transitory media.

The terms "program" or "software" are used herein in a generic sense to refer to any type of computer code or set of processor-executable instructions that can be employed to program a computer or other processor to implement various aspects of embodiments as discussed above. Additionally, it should be appreciated that according to one aspect, one or more computer programs that when executed perform methods of the disclosure provided herein need not reside on a single computer or processor but may be distributed in a modular fashion among different computers or processors to implement various aspects of the disclosure provided herein.

Processor-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, data structures may be stored in one or more non-transitory computer-readable storage media in any suitable form. For simplicity of illustration, data structures may be shown to have fields that are related through location in the data structure. Such relationships may likewise be achieved by assigning storage for the fields with locations in a non-transitory computer-readable medium that convey relationships between the fields. However, any suitable mechanism may be used to establish relationships among information in fields of a data structure, including through the use of pointers, tags or other mechanisms that establish relationships among data elements.

Having thus described several aspects and embodiments of the technology of this application, it is to be appreciated that various alterations, modifications, and improvements will readily occur to those of ordinary skill in the art. Such alterations, modifications, and improvements are intended to be within the spirit and scope of the technology described in the application. It is, therefore, to be understood that the foregoing embodiments are presented by way of example only and that, within the scope of the appended claims and equivalents thereto, inventive embodiments may be practiced otherwise than as specifically described. In addition, any combination of two or more features, systems, articles, materials, and/or methods described herein, if such features, systems, articles, materials, and/or methods are not mutually inconsistent, is included within the scope of the present disclosure.

While various embodiments have been described as providing a reader for use by law enforcement personnel, it should be appreciated that other users may use the devices and methods described herein. For example, other government officials, agency representatives, security personnel, or airline representatives may use devices of the types described herein in alternative embodiments. Thus, references to use by law enforcement personnel should be understood to represent a non-limiting example.

Also, as described, some aspects may be embodied as one or more methods. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

The definitions, as defined and used herein, should be understood to control over dictionary definitions, definitions in documents incorporated by reference and/or ordinary meanings of the defined terms.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified.

The indefinite articles "a" and "an," as used herein in the specification and in the claims, unless clearly indicated to the contrary, should be understood to mean "at least one."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

The terms "approximately," "substantially," and "about" may be used to mean within ±10% of a target value in some embodiments. The terms "approximately," "substantially," and "about" may include the target value.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another claim element having a same name (but for use of the ordinal term) to distinguish the claim elements.

Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

What is claimed is:

1. An electronic identification reader configured to read government-issued electronic identification, comprising:

a handheld housing;

a wireless communication module disposed within the handheld housing and configured to communicate wirelessly with a mobile electronic device storing a government-issued electronic identification to receive the government-issued electronic identification from the mobile electronic device;

at least one touch-sensitive control disposed on the handheld housing;

a camera disposed in the handheld housing and configured to, in response to a first input from the at least one touch-sensitive control, capture an image of a code of a physical identification;

at least one processor disposed in the handheld housing and configured to:

in response to a second input from the at least one touch-sensitive control, trigger the mobile electronic device to prompt a user of the mobile electronic device with a request for approval to transmit the government-issued electronic identification from the mobile electronic device;

upon receiving the approval to transmit the government-issued electronic identification from the mobile electronic device, request the government-issued electronic identification;

perform the receiving the government-issued electronic identification from the mobile electronic device; and obtain identification information from the government-issued electronic identification;

a physical connection between the electronic identification reader and a vehicle-mounted docking system configured to transfer the identification information from the government-issued electronic identification to the vehicle-mounted docking system, wherein the at least one processor is further configured to, after the physical connection transfers the identification information from the government-issued electronic identification to the vehicle-mounted docking system, delete the identification information from the government-issued electronic identification from the electronic identification reader.

2. The electronic identification reader of claim 1, further comprising:

a retention member configured to engage a complementary retention feature of a body-mounted holster.

3. The electronic identification reader of claim 2, further comprising an NFC circuit, wherein the at least one processor is configured to, after a triggering event, lock the electronic identification reader until the NFC circuit detects an NFC tag of a docking system or the holster.

4. The electronic identification reader of claim 1, wherein:

receiving the government-issued electronic identification from the mobile electronic device comprises limiting transfer of information from the mobile electronic device other than the government-issued electronic identification.

5. The electronic identification reader of claim 1, further configured to:

obtain a plurality of pieces of information from one or more persons, wherein at least one piece of information of the plurality of pieces of information is selected from the group consisting of: an identification, a vehicle registration, and a vehicle insurance, wherein the electronic identification reader further comprises a display configured to display the plurality of pieces of information.

6. The electronic identification reader of claim 1, further configured to wirelessly connect to a wireless docking system.

7. A method of reading government-issued identifications, the method comprising:

using a wireless communication module disposed within a handheld housing of an electronic identification reader to communicate wirelessly with a mobile electronic device storing a government-issued electronic identification to receive the government-issued electronic identification from the mobile electronic device;

in response to a first input from at least one touch-sensitive control disposed on the handheld housing, using a camera disposed in the handheld housing to capture an image of a code of a physical identification;

using at least one processor disposed in the handheld housing to:

in response to a second input from the at least one touch-sensitive control, trigger the mobile electronic device to prompt a user of the mobile electronic device with a request for approval to transmit the government-issued electronic identification from the mobile electronic device;

upon receiving the approval to transmit the government-issued electronic identification from the mobile electronic device, request the government-issued electronic identification;

perform the receiving the government-issued electronic identification from the mobile electronic device; and obtain identification information from the government-issued electronic identification;

using a physical connection between the electronic identification reader and a vehicle-mounted docking system to transfer the identification information from the government-issued electronic identification to the vehicle-mounted docking system, after using the physical connection to transfer the identification information from the government-issued electronic identification to the vehicle-mounted docking system, using the at least one processor to delete the identification information from the government-issued electronic identification from the electronic identification reader.

8. The method of claim 7, further comprising:

encrypting the government-issued electronic identification.

9. The method of claim 7, wherein:

receiving the government-issued electronic identification comprises limiting transfer of information from the mobile electronic device other than the government-issued electronic identification.

10. At least one non-transitory computer-readable storage medium having instructions encoded thereon that, when executed by at least one processor, cause the at least one processor to carry out:

using a wireless communication module disposed within a handheld housing of an electronic identification reader to communicate wirelessly with a mobile electronic device storing a government-issued electronic identification to receive the government-issued electronic identification from the mobile electronic device;

in response to a first input from at least one touch-sensitive control disposed on the handheld housing, using a camera disposed in the handheld housing to capture an image of a code of a physical identification;

using at least one processor disposed in the handheld housing to:

in response to a second input from the at least one touch-sensitive control, trigger the mobile electronic device to prompt a user of the mobile electronic device with a request for approval to transmit the government-issued electronic identification from the mobile electronic device;

upon receiving the approval to transmit the government-issued electronic identification from the mobile electronic device, request the government-issued electronic identification;

perform the receiving the government-issued electronic identification from the mobile electronic device; and obtain identification information from the government-issued electronic identification;

using a physical connection between the electronic identification reader and a vehicle-mounted docking system to transfer the identification information from the government-issued electronic identification to the vehicle-mounted docking system, after using the physical connection to transfer the identification information from the government-issued electronic identification to the vehicle-mounted docking system, using the at least one processor to delete the identification information from the government-issued electronic identification from the electronic identification reader.

11. The at least one non-transitory computer-readable storage medium of claim 10, further comprising:

instructions encoded thereon that, when executed by the at least one processor, cause the at least one processor to carry out encrypting the government-issued electronic identification.

12. The at least one non-transitory computer-readable storage medium of claim 10, further comprising:

instructions encoded thereon that, when executed by the at least one processor, cause the at least one processor to connect with the docking system, and after connecting with the docking system, selectively perform at least one of:

transferring the identification information from the electronic identification reader to the docking system;

deleting the identification information from the electronic identification reader; or installing an update to the electronic identification reader.

13. The at least one non-transitory computer-readable storage medium of claim 10, wherein:

receiving the government-issued electronic identification comprises limiting transfer of information from the mobile electronic device other than the government-issued electronic identification.

* * * * *